(12) United States Patent
See et al.

(10) Patent No.: US 10,673,484 B2
(45) Date of Patent: Jun. 2, 2020

(54) ANTENNA DIVERSITY SWITCHING

(71) Applicant: QUALCOMM Incorporated, San Diego, CA (US)

(72) Inventors: Andrew Puayhoe See, San Diego, CA (US); David Maldonado, Rancho Santa Fe, CA (US); Gurkanwal Sahota, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 31 days.

(21) Appl. No.: 15/976,711

(22) Filed: May 10, 2018

(65) Prior Publication Data

US 2018/0331714 A1  Nov. 15, 2018

Related U.S. Application Data

(60) Provisional application No. 62/505,733, filed on May 12, 2017.

(51) Int. Cl.
| | |
|---|---|
| *H04B 1/44* | (2006.01) |
| *H04B 7/06* | (2006.01) |
| *H04B 1/00* | (2006.01) |
| *H01Q 5/50* | (2015.01) |
| *H04B 7/08* | (2006.01) |

(Continued)

(52) U.S. Cl.
CPC ............... *H04B 1/44* (2013.01); *H01Q 5/50* (2015.01); *H04B 1/006* (2013.01); *H04B 1/0057* (2013.01); *H04B 1/0064* (2013.01); *H04B 1/0067* (2013.01); *H04B 1/525* (2013.01); *H04B 1/58* (2013.01); *H04B 7/0602* (2013.01);

(Continued)

(58) Field of Classification Search
None
See application file for complete search history.

(56) References Cited

U.S. PATENT DOCUMENTS 7,110,381 B1 * 9/2006 O'Sullivan .......... H04B 7/0814
370/338
7,505,790 B2  3/2009 Chang et al.
(Continued)

FOREIGN PATENT DOCUMENTS

EP  2774281 A1  9/2014

OTHER PUBLICATIONS

International Search Report and Written Opinion—PCT/US2018/032425—ISA/EP—dated Aug. 24, 2018.
(Continued)

*Primary Examiner* — Xavier S Wong
(74) *Attorney, Agent, or Firm* — Hunter Clark PLLC

(57) ABSTRACT

A method includes: controllably configuring at least one antenna diversity switch in a wireless device to establish conductive paths between at least one transceiver of the wireless device and multiple antennas each disposed at a respective one of a multiple areas of a housing of the wireless device; and routing signals between the at least one transceiver and the multiple antennas, via the at least one antenna diversity switch, such that a signal is routed to either of at least two of the multiple antennas disposed at a first end area of the multiple areas of the housing of the wireless device or to either of at least two other antennas disposed at a second end area of the multiple areas of the housing of the wireless device.

22 Claims, 10 Drawing Sheets

(51) Int. Cl.
    *H04B 1/58*     (2006.01)
    *H04B 1/525*     (2015.01)

(52) U.S. Cl.
    CPC ......... *H04B 7/0693* (2013.01); *H04B 7/0814* (2013.01); *H04B 7/0877* (2013.01)

(56) References Cited

U.S. PATENT DOCUMENTS

| | | | |
|---|---|---|---|
| 9,143,208 B2* | 9/2015 | Khlat | H04B 7/0404 |
| 9,800,443 B2 | 10/2017 | Liu et al. | |
| 2001/0012764 A1* | 8/2001 | Edwards | H01Q 3/2605 |
| | | | 455/69 |
| 2006/0025171 A1* | 2/2006 | Ly | H04B 1/006 |
| | | | 455/553.1 |
| 2009/0316612 A1* | 12/2009 | Poilasne | H01Q 1/2266 |
| | | | 370/297 |
| 2013/0157603 A1* | 6/2013 | Behzad | H04B 1/0057 |
| | | | 455/272 |
| 2014/0169243 A1 | 6/2014 | Khlat et al. | |
| 2014/0342678 A1 | 11/2014 | Khlat | |
| 2016/0020737 A1 | 1/2016 | Kong et al. | |
| 2016/0036508 A1* | 2/2016 | Szini | H04B 7/0814 |
| | | | 375/227 |
| 2017/0179997 A1 | 6/2017 | Liao et al. | |
| 2018/0007600 A1* | 1/2018 | Gopal | H04B 7/04 |
| 2018/0069616 A1 | 3/2018 | Kim et al. | |
| 2018/0337697 A1* | 11/2018 | Kim | G01R 29/08 |

OTHER PUBLICATIONS

Shoji Y., et al., "70-GHz-Band MMIC Transceiver with Integrated Antenna Diversity System: Application of Receiver-Module-Arrayed Self-Heterodyne Technique", IEEE Transactions on Microwave Theory and Techniques, Nov. 2004, vol. 52, No. 11, pp. 2541-2549.

Wang C-J., et al., "A Pattern-Diversity Antenna Module for Dual-Band WLAN Systems", IEEE 60th Vehicular Technology Conference, 2004, pp. 211-215.

\* cited by examiner

Delta switch is a
3-way switch

P1 is connected to P2

P1 is connected to P3

P2 is connected to P3

ANTENNA DIVERSITY SWITCHING

CROSS-REFERENCE TO RELATED APPLICATIONS

This application claims the benefit of U.S. Provisional Application No. 62/505,733, filed May 12, 2017, entitled "ANTENNA DIVERSITY SWITCHING," the entire contents of which are hereby incorporated herein by reference.

BACKGROUND

Various wireless devices are configured to handle different types of communication protocols and technologies, including WWAN technologies (e.g., LTE), WLAN technologies (e.g., WiFi), satellite communications (GNSS-based signals), etc. The requirements of handling multiple different communication technologies, and the increased demand for concurrently handling multiple wireless signals, increases the implementation complexity of wireless devices. Moreover, concurrent processing of multiple wireless signals can, if not managed properly, result in degraded performance, e.g., increased interference and noise level resulting from the simultaneous transmission or reception of multiple wireless signals by a wireless device.

SUMMARY

An example wireless device includes: at least one transceiver configured to transmit and receive multiple signals; a housing comprising a first end area and a second end area, the housing containing the at least one transceiver; multiple antennas with at least one of the multiple antennas disposed in the first end area and at least one other of the multiple antennas disposed in the second end area; at least one antenna diversity switch communicatively coupled to the at least one transceiver and the multiples antennas, the at least one antenna diversity switch configured to controllably establish conductive paths between the at least one transceiver and the multiple antennas to route a signal to a selected one of: any of at least two of the multiple antennas disposed at the first end area of the housing and at least two other antennas disposed at the second end area of the housing; and a controller communicatively coupled to the at least one antenna diversity switch and configured to cause the at least one antenna diversity switch to establish the conductive paths between the at least one transceiver and the multiple antennas.

Implementations of such a wireless device may include one or more of the following features. The wireless device further includes an N-plexer coupled to a corresponding one of the multiple antennas, wherein the conductive paths include independent paths between the at least one transceiver and the N-plexer such that a first signal will be routed through a first one of the independent paths and a second signal will be routed through a second one of the independent paths, with the first one of the independent paths being different from the second one of the independent paths. The conductive paths include independent paths between the at least one transceiver and the multiple antennas, the independent paths including a transmit path and a receive path, the transmit path being configured to convey a transmit signal without concurrently conveying a receive signal. A first one of the independent paths connects a first signal processing module of the wireless device to a first antenna of the multiple antennas and a second one of the independent paths connects a second signal processing module of the wireless device to a second antenna of the multiple antennas, the first signal processing module being different than the second signal processing module and the first antenna being separate from the second antenna.

Also or alternatively, implementations of such a wireless device may include one or more of the following features. The controller is configured to cause the at least one antenna diversity switch to establish a first path of the conductive paths between the at least one transceiver and a first antenna of the multiple antennas for transmission of first signals, and to establish a second path of the conductive paths between the at least one transceiver and a second antenna of the multiple antennas for transmission of second signals, the first antenna and the second antenna configured and disposed to radiate the first signals and the second signals away from each other, the first path being separate from the second path. The controller is configured to cause the at least one antenna diversity switch to establish the first path to carry one or more of WAN-based signals or Bluetooth-based signals, and establish the second path to carry WLAN-based signals. The controller is configured to cause the at least one antenna diversity switch to establish a third path of the conductive paths between the at least one transceiver and a third antenna of the multiple antennas to carry GNSS-based signals, the third path being separate from the first path and the second path.

Also or alternatively, implementations of such a wireless device may include one or more of the following features. The at least one antenna diversity switch comprises at least three throws and at least three poles. The controller is configured to cause the at least one antenna diversity switch to establish multiple paths of the conductive paths between four separate antennas each receiving a different copy of a signal, and respective four modules each configured to process one of the four different copies of the signal. The at least one antenna diversity switch comprises: a 3×3 antenna matrix switch, a 4×3 antenna matrix switch, a 5×3 antenna matrix switch, or a 5×4 antenna matrix switch, or any combination thereof. The controller is configured to cause the at least one antenna diversity switch to establish the conductive paths between the at least one transceiver and the multiple antennas based on a respective performance metric of each of the multiple antennas. The controller is configured to cause the at least one antenna diversity switch to establish the conductive paths between the at least one transceiver and the multiple antennas based on a respective signal interference level of each of the multiple antennas. The controller is configured to dynamically cause the at least one antenna diversity switch to establish the conductive paths between the at least one transceiver and either of two antennas located in a particular area of the wireless device such that a first conductive path is established at a first time instance between the at least one transceiver and a first of the two antennas located in the particular area of the wireless device to carry signals from a particular frequency band, and a second conductive path is established at a subsequent time instance between the at least one transceiver and a second of the two antennas located in the particular area of the wireless device to carry the signals from the particular frequency band.

An example method includes: controllably configuring at least one antenna diversity switch in a wireless device to establish conductive paths between at least one transceiver of the wireless device and multiple antennas each disposed at a respective one of a multiple areas of a housing of the wireless device; and routing signals between the at least one transceiver and the multiple antennas, via the at least one antenna diversity switch, such that a signal is routed to either of at least two of the multiple antennas disposed at a first end area of the multiple areas of the housing of the wireless device or to either of at least two other antennas disposed at a second end area of the multiple areas of the housing of the wireless device.

Implementations of such a method may include one or more of the following features. Controllably configuring the at least one antenna diversity switch includes establishing independent paths between the at least one transceiver and one or more N-plexers, each coupled to a respective antenna of the multiple antennas, via the at least one antenna diversity switch, and routing the signals includes routing a first signal through a first one of the independent paths and a second signal through a second one of the independent paths, with the first one of the independent paths being different from the second one of the independent paths. Controllably configuring the at least one antenna diversity switch includes: establishing a first path between the at least one transceiver and a first antenna to carry WLAN-based signals; and establishing a second, different, path between the at least one transceiver and a second antenna of the multiple antennas to carry WWAN-based signals. Controllably configuring the at least one antenna diversity switch includes: establishing a first path between the at least one transceiver and a first antenna for transmission of first signals; and establishing a second, different, path between the at least one transceiver and a second antenna of the multiple antennas for reception of second signals. Controllably configuring the at least one antenna diversity switch includes: establishing conductive paths between the at least one transceiver and the multiple antennas based on a respective signal interference level of each of the multiple antennas. Routing the signals includes: routing a transmit signal from the at least one transceiver to the at least one antenna diversity switch on a first path without concurrently conveying a first receive signal on the first path; routing the transmit signal from the at least one antenna diversity switch to a first antenna of the multiple antennas; and routing one or more second receive signals, received via a second antenna of the multiple antennas, from the at least one antenna diversity switch to the at least one transceiver on a second path, the second antenna being separate from the first antenna.

An example apparatus includes: control means for controllably configuring at least one antenna diversity switch in a wireless device to establish conductive paths between at least one transceiver of the wireless device and multiple antennas disposed at respective multiple areas of a housing of the wireless device; and routing means for routing signals between the at least one transceiver and the multiple antennas, via the at least one antenna diversity switch, such that a signal is routed to either of at least two of the multiple antennas disposed at a first end area of the housing of the wireless device or to either of at least two other antennas disposed at a second end area of the housing of the wireless device.

Implementations of such an apparatus may include one or more of the following features. The control means are for establishing independent paths between the at least one transceiver and one or more N-plexers, each coupled to a respective antenna of the multiple antennas, via the at least one antenna diversity switch, such that a first signal is routed through a first one of the independent paths and a second signal is routed through a second one of the independent paths, with the first one of the independent paths being different from the second one of the independent paths. The routing means are for: routing a transmit signal from the at least one transceiver to the at least one antenna diversity switch on a first path without concurrently conveying a first receive signal on the first path; routing the transmit signal from the at least one antenna diversity switch to a first antenna of the multiple antennas; and routing one or more second receive signals, received via a second antenna of the multiple antennas, from the at least one antenna diversity switch to the at least one transceiver on a second path, the second antenna being separate from the first antenna. The first signal is a first transmit signal and has a first frequency and the second signal is a second transmit signal and has a second frequency that is different from the first frequency, and wherein the routing means are for routing a first received signal having the first frequency and a second received signal having the second frequency from a same one of the multiple antennas to the at least one transceiver via the first one of the independent paths.

Also or alternatively, implementations of such an apparatus may include one or more of the following features. The control means are for establishing a first path between the at least one transceiver and a first antenna of the multiple antennas to carry one or more of WLAN-based signals or Bluetooth-based signals, for establishing a second path between the at least one transceiver and a second antenna of the multiple antennas to carry WWAN-based signals, and for establishing a third path, different from the first path or the second path, between the at least one transceiver and a third antenna of the multiple antennas to carry GNSS-based wireless signals. The control means are for establishing the conductive paths between the at least one transceiver and the multiple antennas based on a respective performance metric of each of the multiple antennas.

Another example wireless device includes: a first antenna disposed near a first area of the wireless device; a second antenna disposed near the first area of the wireless device; a third antenna disposed near a second area of the wireless device, the second area being remote from the first area; one or more transceivers; a first switch comprising at least three poles and at least three throws, a first pole of the first switch coupled to a first signal path associated with at least one transceiver of the one or more transceivers, a second pole of the first switch coupled to a second signal path associated with the at least one transceiver of the one or more transceivers or a second transceiver of the one or more transceivers, a first throw of the first switch coupled to the first antenna, and a second throw of the first switch coupled to the second antenna; and a second switch having a pole coupled to a third throw of the first switch and a throw coupled to a third pole of the first switch, the second switch further having at least one throw coupled to the third antenna.

Implementations of such a wireless device may include one or more of the following features. The second switch includes at least three poles and at least three throws, a first pole of the second switch coupled to a third signal path associated with at least one additional transceiver, a second pole of the second switch coupled to a fourth signal path associated with the at least one additional transceiver or a further additional transceiver, a third pole of the second switch coupled to the third throw of the first switch, a first throw of the second switch coupled to the third antenna, a second throw of the second switch coupled to a fourth antenna, and a third throw of the second switch coupled to the third pole of the first switch. The at least one transceiver comprises a WAN transceiver, and the at least one additional transceiver comprises a WLAN transceiver. The first antenna and the second antenna are coupled to the first throw of the first switch and the second throw of the first switch via a first N-plexer and a second N-plexer, respectively. The first N-plexer is coupled to a third switch, the third switch being further coupled to a third signal path associated with the at least one transceiver of the one or more transceivers, and wherein the second N-plexer is further coupled to a fourth switch, the fourth switch being coupled to a fourth signal path associated with the at least one transceiver of the one or more transceivers or the second transceiver of the one or more transceivers.

BRIEF DESCRIPTION OF THE DRAWINGS

Like reference symbols in the various drawings indicate like elements.

DETAILED DESCRIPTION

Figure 1:
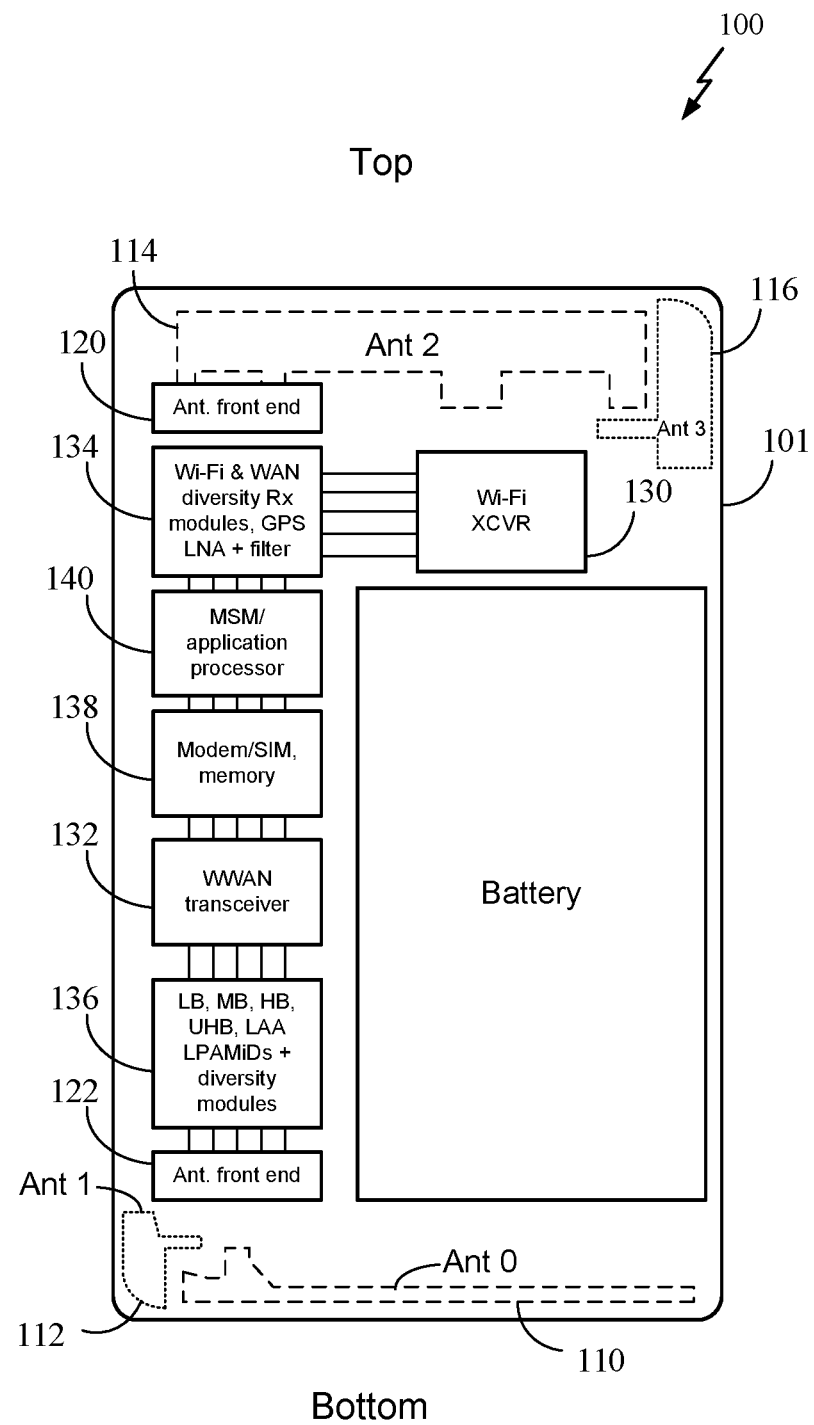
FIG. 1 is a diagram of a layout of an example wireless device.

Disclosed herein are devices, methods, apparatus, computer readable media, and other implementations, including a wireless device comprising at least one transceiver configured to transmit and receive multiple wireless signals (which may be in multiple frequency bands), a housing comprising a first end area and a second end area, with the housing containing the at least one transceiver, multiple antennas disposed at respective multiple areas of the housing, and at least one antenna diversity switch communicatively coupled to the at least one transceiver and the multiples antennas. The at least one antenna diversity switch is configured to controllably establish conductive paths between the at least one transceiver and the multiple antennas such that the at least one antenna diversity switch is configured to route a wireless signal to either of at least two of the multiple antennas disposed at the first end area (or at some other first areas) of the housing or to either of at least two other antennas disposed at the second end area (or some other second area) of the housing. The wireless device further comprises a controller to cause selection of the paths established between the at least one transceiver, the at least one antenna diversity switch, and the multiple antennas. In some embodiments, the at least one antenna diversity switch is configured to dynamically establish conductive paths between the at least one transceiver and either of two antennas located in a particular area of wireless device such that a first conductive path is established at a first time instance between the at least one transceiver and a first of the two antennas located in the particular area of the wireless device to carry signals from a particular frequency band, and a second conductive path is established at a subsequent time instance between the at least one transceiver and a second of the two antennas located in the particular area of the wireless device to carry the signals from the particular frequency band. In some embodiments, the at least one antenna diversity switch may include an antenna switch with at least three terminals, such as a 3×3, 4×3, or 5×3 antenna matrix switch.

A wireless device is capable of wireless communication, e.g., wireless reception of a communication signal and/or wireless transmission of a communication signal as discussed herein. A wireless device may be mobile or static, and may be, or may be referred to as, e.g., a user equipment (UE) (as referred to in UMTS (Universal Mobile Telecommunications System) applications), a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, an access point (AP), a base station (BS), an eNodeB, a NodeB, a Secure User Plane Location (SUPL) Enabled Terminal (SET), a target device, etc. Examples of wireless devices include cellular phones, smartphones, laptops, tablets, personal communication systems (PCSs), personal navigation devices (PNDs), personal information managers (PIMs), personal digital assistants (PDAs), etc. A wireless device may communicate wirelessly using one or more technologies, e.g., cellular, satellite, infrared, short-range wireless, etc.

Implementations described herein provide an antenna system (WWAN/WLAN), and may include a WAN/WLAN modem, a multi-antenna system (e.g., 4-antenna system, 7-antenna system, or a system with any number of antennas), multi-carrier DLCA 4×4 MIMO, Tx ULCA/MIMO, 2×4 2.4/5 GHz WiFi, and increase (or maximization of) TRP/TIS (total radiated power, total isotropic sensitivity) with and without user interaction (e.g., 4-way WWAN/WLAN antenna switch diversity (AsDiv)). Described elements may allow antennas and modules sharing, use of an increased number of bands in modules, and scalability. Certain implementations may include a smart WAN/WLAN antenna resource and a coexistence manager with a modem, and/or non-linear interference cancellation (NLIC). NLIC uses knowledge of a transmit signal of a transmitter to mitigate transmit interference in a receiver. At least some implementations provide for antenna diversity, with multiple antennas used for conveying signals to attempt to improve performance. For example, at least some implementations provide spatial diversity of antennas although other forms of antenna diversity, e.g., transmit/receive diversity, may also are alternatively be provided.

FIG. 1 is a diagram of a layout of an example wireless device 100. As illustrated, the wireless device 100 includes, in this example, four antennas identified as antenna 110 (Ant 0), antenna 112 (Ant 1), antenna 114 (Ant 2), and antenna 116 (Ant 3). Additional antennas may be used, in some embodiments, with the wireless device 100. The antennas 110, 112, 114, and 116 are implemented in the present example to have particular respective structures that may facilitate communication for particular RF bands. For example, the antennas 110, 114 are depicted as being larger than the antennas 112, 116, and may thus be structured to receive different RF frequency signals than those received by antennas 112 and 116. In an example, the antennas 110 and 114 may be more suitable to handle RF signals having frequencies in the frequency range of 600-5925 MHz, while the antennas 112 and 116 may be more suitable for handling signals having RF frequencies in the range of, for example, 1400-5925 MHz. The shapes, structures, locations, and other attributes of the antennas 110, 112, 114, and 116 may be implemented to have other configurations and characteristics than those depicted in FIG. 1.

As further depicted in FIG. 1, connected to each of the antennas at each of the top and bottom ends of a housing 101 of the wireless device 100, are antenna-front-end circuits 120 and 122. As will be discussed in greater detail below, the antenna front-end circuits may include (each or jointly) at least one antenna diversity switch (not shown in FIG. 1, but more particularly illustrated at, for example, FIG. 3) controllably configurable to establish selectable and independent paths between front end modules of the wireless device (e.g., filters, power amplifiers, modems, etc.) and N-plexers and possibly the various antennas of the wireless device 100. Each antenna diversity switch may thus be configured to controllably establish conductive paths between the at least one transceiver and the multiple antennas (e.g., the antennas 110, 112, 114, and/or 116) such that the antenna diversity switch can route a wireless signal (to or from) either of at least two of the multiple antennas disposed at the first end area (e.g., the top end area) of the housing or to either of at least two other antennas disposed at the second end area (e.g., the bottom end area) of the housing. For example, a controller of the wireless device (e.g., implemented at the antenna diversity switch or at an inner logical layer at, for example, an application processor 140, at a modem or a transceiver of the wireless device, etc.) may be configured to establish independent paths (e.g., through actuations of the antenna diversity switch via actuation signals sent by the controller) between at least one transceiver of the wireless device (such a transceiver may be implemented as a combination of a separate receiver and a separate transmitter, or may be a consolidated/integrated transmitter/receiver device) and the multiple antennas, via the at least one antenna diversity switch, such that a first wireless signal is routed through a first one of the independent paths and a second wireless signal is routed through a second one of the independent paths, with the first one of the independent paths being different from the second one of the independent paths. The antenna front-end circuit may also include, for example, antenna tuners, N-plexers connected to the antennas of the wireless device to extract signals within desired frequency ranges. The N-plexers are connected to the antenna ports for antenna sharing (multiple band antenna sharing). The independent paths may be established between the at least one transceiver and the N-plexers (with an N-plexer having a shared connection to/from a corresponding antenna). In some embodiments, different antennas may be connected to different N-plexers. For example, one antenna (e.g., the antenna 114) may be connected to an N-plexer to extract signals arriving/detected at the antenna 114 of the frequency range corresponding to the selected antenna (e.g., signals in the range of 1700-2690 MHZ, signals in the range of 3400-5920 MHz, etc.). The end areas as described herein may include a top and bottom of a device, for example within about 10 or 20 mm of the top or bottom of a housing of the device, a side and another side of the device, a top of the device and a side of the device, etc. The end areas may include any two locations or areas which are remote from each other, e.g., separate from each other such as being separated by one or more components. For example, a transceiver, battery, etc. may be separate the end areas in some embodiments.

With continued reference to FIG. 1, connected to the antenna front-end circuitries are, for example, a WLAN transceiver 130 (XCVR) (e.g., to support/process WiFi signals) communicatively coupled (via a bus or dedicated strip lines) to a wireless WAN transceiver 132. Other modules of the wireless device 100 include various front-end filtering and other signal processing modules, such as the WAN diversity Rx module+GPS low-noise amplifier module 134 and the amplifier and filtering module 136 (configured for low band (LB), mid band (MB), high band (HB), ultra-high band (UHB), licensed-assisted access (LAA) LPAMiDsP-AMiD's plus diversity modules), and the mobile device modem 138, which may include a SIM card and memory/storage devices. While certain of these elements are illustrated in FIG. 1 as being included together (e.g., WiFi, WAN, and/or GPS in 134), modules or aspects comprising these elements may be implemented separately. They may also be implemented as a single module as illustrated. The application processor 140 may be implemented as part of the modem 138, or, in some embodiments, may be a separate unit.

As will be discussed in greater detail below, the wireless device 100 of FIG. 1 is configured to concurrently process/handle multiple wireless signals using at least one antenna diversity switch configured to route and assign different wireless signals (which may be distributed in different bands) to different antennas. The multiple signals may correspond to different signal protocols or technologies. By way of a non-exhaustive example, the wireless device 100 (and likewise the wireless devices described below in relation to other figures) may be configured to manage wireless signals belonging to a large range of different frequency division duplex (FDD) LTE, or time-division duplex (TDD) LTE, communication bands that include the bands in Table 1 below, and/or one or more other frequency bands such as a 5G band, a GSM band, a UMTS (Universal Mobile Telecommunications System) band, a WiMAX (Worldwide Interoperability for Microwave Access) band, etc.

TABLE 1

| band | uplink (MHz) | uplink (MHz) | band group |
|------|--------------|--------------|------------|
| 5    | 824-849      | 869-894      | LOW        |
| 6    | 830-840      | 875-885      | LOW        |
| 8    | 880-915      | 925-960      | LOW        |
| 12   | 698-716      | 728-746      | LOW        |
| 13   | 777-787      | 746-756      | LOW        |
| 14   | 788-798      | 788-798      | LOW        |
| 17   | 704-716      | 734-746      | LOW        |
| 18   | 815-830      | 860-875      | LOW        |
| 19   | 830-845      | 875-890      | LOW        |
| 20   | 832-862      | 791-821      | LOW        |
| 26   | 814-849      | 859-894      | LOW        |
| 27   | 807-824      | 852-869      | LOW        |
| 28   | 703-748      | 758-803      | LOW        |
| 29   | n/a          | 717-728      | LOW        |
| 31   | 452.5-457.5  | 462.5-467.5  | LOW        |
| 1    | 1920-1980    | 2110-2170    | MID        |
| 2    | 1850-1910    | 1930-1990    | MID        |
| 3    | 1710-1785    | 1805-1880    | MID        |
| 4    | 1710-1755    | 2110-2155    | MID        |
| 9    | 1749.9-1784.9 | 1844.9-1879.9 | MID     |
| 10   | 1710-1770    | 2110-2170    | MID        |
| 11   | 1427.9-1452.9 | 1475.9-1500.9 | MID     |
| 15   | 1900-1920    | 2600-2620    | MID        |
| 21   | 1447.9-1462.9 | 1495.5-1510.9 | MID     |
| 23   | 2000-2020    | 2180-2200    | MID        |
| 24   | 1625.5-1660.5 | 1525-1559   | MID        |
| 25   | 1850-1915    | 1930-1995    | MID        |
| 7    | 2500-2570    | 2620-2690    | HIGH       |
| 16   | 2010-2025    | 2585-2600    | MID/HIGH   |

TABLE 1-continued

| band | uplink (MHz) | uplink (MHz) | band group |
|---|---|---|---|
| 30 | 2305-2315 | 2350-2360 | HIGH |
| 22 | 3410-3500 | 3510-3600 | ULTRA HIGH |

The wireless device may similarly be configured to handle wireless signals for other communication protocols and technologies, including time-division duplex (TDD) LTE (whose example bands are shown in Table 2), WWAN-based signals for other WWAN technologies, WLAN-based signals (e.g., WiFi), short-range protocols (Bluetooth® wireless technology), etc.

TABLE 2

| band | allocation (MHz) | width (MHz) | band group |
|---|---|---|---|
| 44 | 703-803 | 100 | LOW |
| 33 | 1900-1920 | 20 | MID |
| 34 | 2010-2025 | 15 | MID |
| 35 | 1850-1910 | 60 | MID |
| 36 | 1930-1990 | 60 | MID |
| 37 | 1910-1930 | 20 | MID |
| 39 | 1880-1920 | 40 | MID |
| 38 | 2570-2620 | 50 | HIGH |
| 40 | 2300-2400 | 100 | HIGH |
| 41 | 2496-2690 | 194 | HIGH |
| 42 | 3400-3600 | 200 | ULTRA HIGH |
| 43 | 3600-3800 | 200 | ULTRA HIGH |
| n77 | 3300-4200 | 900 | 5G NR band |
| n78 | 3300-3800 | 400 | 5G NR band |
| n79 | 4400-5000 | 600 | 5G NR band |
| 46 | 5150-5925 | 775 | 5 GHz |

Figure 2:
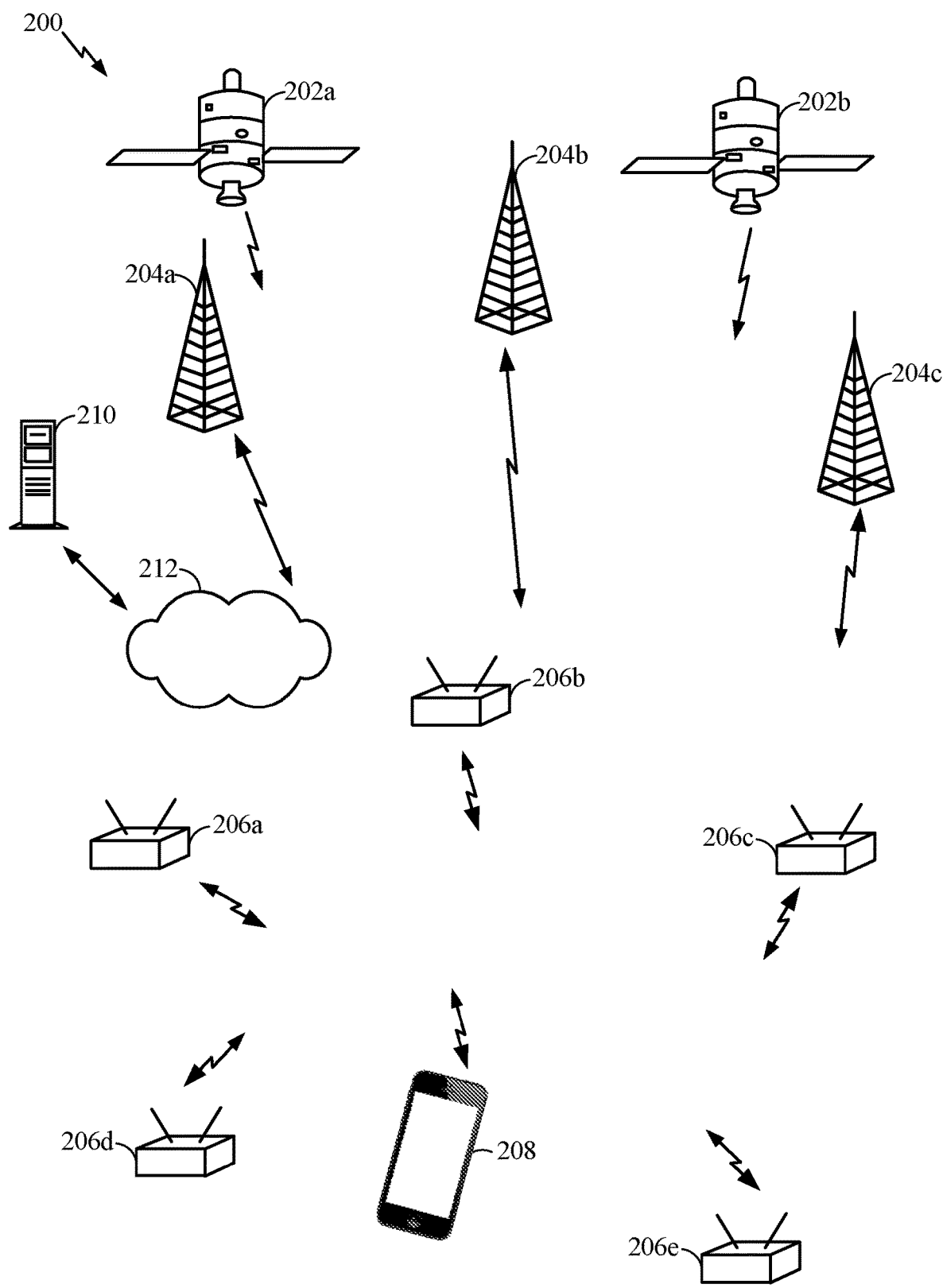
FIG. 2 is a schematic diagram of an example operating environment that includes a wireless mobile device configured for antenna diversity switching.

With reference now to FIG. 2, a schematic diagram of an example operating environment 200 that includes a wireless mobile device, configured for antenna diversity switching, in communication with one or more wireless nodes/devices, is shown. The various wireless nodes/devices of FIG. 2 may be configured to communicate according to one or more communication protocols. In some embodiments, the various wireless devices of FIG. 2, including, the mobile device 208, which may be similar, in implementation and/or configuration, to the wireless device 100 of FIG. 1, may be implemented to support antenna diversity switching. Therefore, in some embodiments, the wireless device 208 may include at least one transceiver configured to transmit and receive multiple wireless signals, a housing comprising a first end area and a second end area, the housing containing the at least one transceiver, multiple antennas (e.g., the antennas 110, 112, 114, and 116 of FIG. 1) disposed at respective multiple areas of the housing, at least one antenna diversity switch (e.g., a 3×3 antenna switch) communicatively coupled to the at least one transceiver and the multiples antennas, and a controller to cause selection of the paths established between the at least one transceiver and the multiple antennas via the at least one antenna diversity switch. In such embodiments, the wireless device 208 may be configured to controllably configure the at least one antenna diversity switch to establish conductive paths between at least one transceiver of the wireless device and multiple antennas disposed at the respective multiple areas of the housing of the wireless device, and route wireless signals (e.g., in multiple frequency bands) between the at least one transceiver and the multiple antennas, via the antenna diversity switch, such that that a wireless signal is routed to either of at least two of the multiple antennas disposed at a first end area of the housing of the wireless device or to either of at least two other antennas disposed at a second end area of the housing of the wireless device.

The wireless device may be configured to communicate according to one or more communication protocols (e.g., WLAN protocols, including WiFi protocol according to IEEE 802.11k standard and short range protocols (such as Bluetooth® wireless technology or ZigBee), WWAN protocols, etc.) The mobile device 208 (as well as any other device depicted in FIG. 2) may be configured to operate and interact with multiple types of other communication systems/devices, including local area network devices (or nodes), such as WLAN devices for indoor communication, femtocells, Bluetooth® wireless technology-based transceivers, and other types of indoor communication network nodes, wide area wireless network nodes, satellite communication systems, other mobile devices, etc. As such, the wireless device 208 may include one or more interfaces and/or transceivers to communicate with the various types of communications systems. The various devices of FIG. 2 may be configured to establish and operate according to any number of communication protocols. As noted, the wireless device 208 is configured to concurrently handle multiple wireless signals, which may be signals from different bands (and corresponding to different communication protocols), or may be related signals traveling through multiple different paths (i.e., to support MIMO functionality).

The environment 200 may contain one or more different types of wireless communication systems or nodes, each of which may be used to establish communication links with the device 208. The nodes illustrated in FIG. 2 include wireless access points (or WAPs) and may include LAN and/or WAN wireless transceivers, including, for example, WiFi base stations, femto cell transceivers, Bluetooth® wireless technology transceivers, cellular base stations, transceivers to support various IEEE 802.11 standards, etc. Thus, for example, and with continued reference to FIG. 2, the environment 200 may include the Local Area Network Wireless Access Points (LAN-WAPs) 206a-e that may be used for wireless voice and/or data communication with the mobile device 208. The LAN-WAPs 206a-e may also be utilized, in some embodiments, as independent sources of position data, e.g., through fingerprinting-based procedures, through implementation of multilateration-based procedures based, for example, on timing-based techniques (e.g., observed-time-difference-of-arrival (or OTDOA), RTT-based measurements, etc.), signal strength measurements (e.g., RSSI measurements), etc. The LAN-WAPs 206a-d can be part of a Wireless Local Area Network (WLAN), which may operate in buildings and perform communications over smaller geographic regions than a WWAN. Additionally in some embodiments, the LAN-WAPs 206a-d could also include pico or femto cells. In some embodiments, the LAN-WAPs 206a-d may be part of, for example, WiFi networks (802.11x), cellular piconets and/or femtocells, Bluetooth® wireless technology networks, etc. Although five (5) LAN-WAP's are depicted in FIG. 2, any number of such LAN-WAP's may be used, and, in some embodiments, the environment 200 may include no LAN-WAPs at all, or may include a single LAN-WAP.

As further illustrated, the environment 200 may also include a plurality of one or more types of the Wide Area Network Wireless Access Points (WAN-WAPs) 204a, 204b, 204c, which may be used for wireless voice and/or data communication, and may also serve as another source of independent information through which the mobile wireless device 208 (and/or other devices) may determine its position/location. The WAN-WAPs 204a-c may be part of wide area wireless network (WWAN), which may include cellular base stations, and/or other wide area wireless systems. A WWAN may include other known network components which are not shown in FIG. 2. Typically, each WAN-WAPs 204a-c within the WWAN may operate from fixed positions or may be moveable, and may provide network coverage over large metropolitan and/or regional areas. Although three (3) WAN-WAPs are depicted in FIG. 2, any number of such WAN-WAPs may be used. In some embodiments, the environment 200 may include no WAN-WAPs at all, or may include a single WAN-WAP.

Communication to and from the mobile device 208 (to exchange data, and facilitate location determination operations and other services to the device 208, etc.) may be implemented using various wireless communication networks and/or technologies and/or encodings, such as a wide area wireless network (WWAN), a wireless local area network (WLAN), a wireless personal area network (WPAN), a peer-to-peer network, and so on. The term "network" and "system" may be used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, and so on. A CDMA network may implement one or more radio access technologies (RATs) such as cdma2000, Wideband-CDMA (W-CDMA), and so on. Cdma2000 includes IS-95, IS-2000, and/or IS-856 standards. A TDMA network may implement Global System for Mobile Communications (GSM), Digital Advanced Mobile Phone System (D-AMPS), or some other radio access technology (RAT). GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. In some embodiments, 4G networks, Long Term Evolution ("LTE") networks, Advanced LTE networks, 5G networks (e.g., 5G NR (New Radio)), Ultra Mobile Broadband (UMB) networks, and/or one or more other types of cellular communications networks may also be implemented and used with the systems, devices methods, and other implementations described herein. A WLAN and/or a WPAN may also be implemented, at least in part, using an IEEE 802.11x network, a Bluetooth® wireless technology network, an IEEE 802.15x, or some other type of network. The techniques described herein may also be used for any combination of WWAN, WLAN and/or WPAN.

In some embodiments, and as further depicted in FIG. 2, the mobile device 208 may also be configured to at least receive information from a Satellite Positioning System (SPS) 202a-b, which may be used as an independent source of position information for the mobile device 208. Location solution the mobile device is configured to derive may also include updated location estimates for satellite vehicles such as the vehicles 202a-b. The mobile device 208 may thus include one or more dedicated SPS receivers configured to receive signals for deriving device geo-location information from the SPS satellites. In embodiments in which the mobile device 208 can receive satellite signals, the mobile device may utilize a receiver (e.g., a GNSS receiver) specifically implemented for use with the SPS to extract position data from a plurality of signals transmitted by at least the SPS satellites 202a-b. Transmitted satellite signals may include, for example, signals marked with a repeating pseudo-random noise (PN) code of a set number of chips and may be located on ground based control stations, user equipment and/or space vehicles. The techniques provided herein may be applied to, or otherwise implemented, for use in various other systems, such as, e.g., Global Positioning System (GPS), Galileo, Glonass, Compass, Quasi-Zenith Satellite System (QZSS) over Japan, Indian Regional Navigational Satellite System (IRNSS) over India, Beidou over China, etc., and/or various augmentation systems (e.g., a Satellite Based Augmentation System (SBAS)) that may be associated with, or otherwise provided, for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein, an SPS may include any combination of one or more global and/or regional navigation satellite systems and/or augmentation systems, and SPS signals may include SPS, SPS-like, and/or other signals associated with such one or more SPS.

As further shown in FIG. 2, the environment 200 may also include a server 210 (e.g., a location server, such as an E-SMLC server, or any other type of server) configured to communicate, via a network 212 (e.g., a cellular wireless network, a WiFi network, a packet-based private or public network, such as the public Internet), or via wireless transceivers included with the server 210, with multiple network elements or nodes, and/or mobile wireless devices. For example, the server 210 may be configured to establish communication links with one or more of the WLAN nodes, such as the access points 206a, 206b, 206c, 206d, 206e, which may be part of the network 212, to communicate data and/or control signals to those access points, and receive data and/or control signals from the access points. Each of the access points 206a-e can, in turn, establish communication links with mobile devices located within range of the respective access points 206a-e. The server 210 may also be configured to establish communication links (directly via a wireless transceiver(s), or indirectly, via a network connection) with one or more of the WWAN nodes, such as the WWAN access points 204a-c depicted in FIG. 2, which may also be part of the network 212, and/or to establish communication links with mobile wireless devices (such as the device 208). The server 210 may also be configured to at least receive information from satellite vehicles 202a and/or 202b of a Satellite Positioning System (SPS), which may be used as an independent source of position information. In some embodiments, the server 210 may be part of, attached to, or reachable from network 212, and may communicate with the mobile wireless device 208, or with any other device or node depicted in FIG. 2. In some embodiments, the server 210 may be configured to perform, at least in part, some of the operations of the procedures described herein to facilitate antenna diversity switching.

Figure 3:
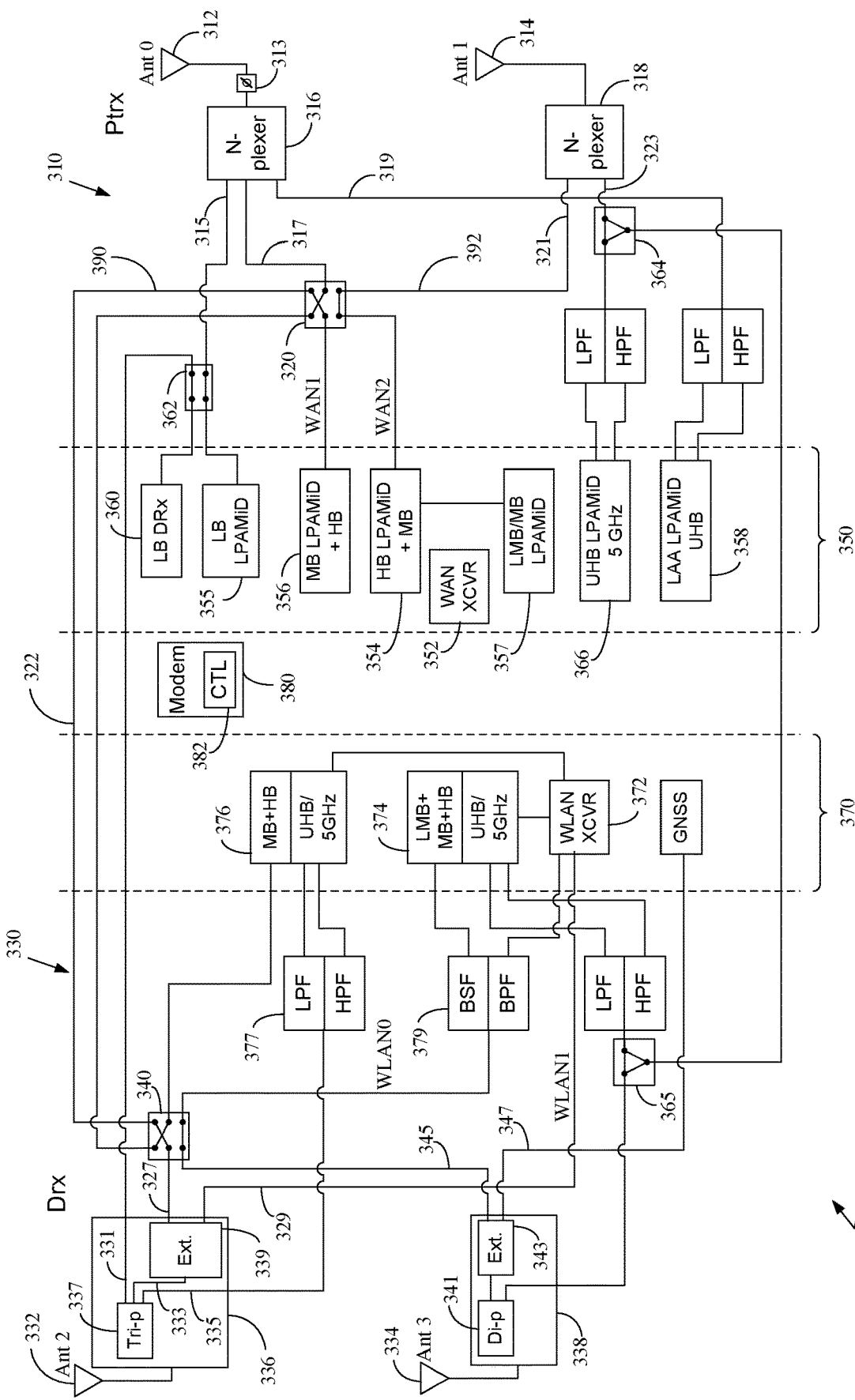
FIG. 3 is a schematic diagram of a wireless device with at least one antenna diversity switch.

With reference now to FIG. 3, a schematic diagram of a wireless device 300, which may be similar (in implementation and/or configuration) to the wireless devices 100 and 208 of FIGS. 1 and 2, respectively, is shown. The schematic diagram of FIG. 3 provides a more detailed illustration of the modules and circuits discussed in relation to FIG. 1. As illustrated, the wireless device 300 includes antenna front-end sections 310 and 330, which include antennas, antenna tuners, filters, and at least one antenna diversity switch, and front-end filtering sections 350 and 370 which include transceivers, filters, amplifiers, and so on, to process wireless signals received from the antennas, or to generate signals to be transmitted via the antennas.

The antenna front-end section 310 of the wireless device 300 includes antennas 312 (marked as Ant 0) and 314 (marked as Ant 1) which are coupled via antenna connectors to respective N-plexers 316 and 318. In some embodiments, one or more of the antennas may also be coupled to a respective antenna tuner, such as a tuner 313 coupled to the antenna 312, to control antenna tuning. As noted with respect to FIG. 1, the antennas disposed in the housing of the wireless device may be of different shapes/structures/materials/configurations that may be suitable for transmission of different frequencies. For example, Ant 0 (the antenna 312) may be configured to receive, transmit and process wireless signals in different bands (referred to as low, mid, and high bands) within a frequency range of 600-5925 MHz, while Ant 1 may be configured to receive, transmit, and otherwise process wireless signals within low, mid, high, and ultra-bands within a frequency range of 1400-5925. However, in some embodiments, through at least control and actuation of an antenna diversity switch 320, the antennas 312 and 314 may handle wireless signals from other ranges and in different bands. In this example, the N-plexer 316 provides antenna sharing of multiple frequency bands. The N-plexer 316 is an N-way (where N is an integer) frequency-based multiplexer configured to transmit and/or receive multiple frequency bands on a single antenna and direct each transmitted and/or received signal to one of N respective outputs, and vice versa (i.e., to direct signals received on N inputs to the antenna). The N-plexer 316 is coupled to the antenna 312 and is configured to convey signals with frequencies below 960 MHz (e.g., 700-960 MHz) to and from a line 315, to convey mid-band signals with frequencies between 1700 MHz and 2690 MHz to and from a line 317, and to convey high-band signals with frequencies above 3400 MHz (e.g., 3400-5920 MHz) to and from a line 319. The N-plexer 316 is configured to selectively extract (e.g., filter) at least a portion of signals received from the antenna 312, or signals that are to be transmitted through the antenna 312, as the antenna may be shared by signals from multiple (different) bands. For example, the wireless signaling in particular bands may be removed or suppressed so as to leave the wireless signals from one or more other bands in tact (e.g., apply filtering to remove low band (LB) components, but retain mid-band and high-band components). A similar implementation is applied to signals received from, or transmitted through, the antenna 314 (Ant 1). In this example, the N-plexer 318 is configured to multiplex signals of multiple frequency bands and provides antenna sharing of multiple frequency bands. The N-plexer 318 is coupled to the antenna 314 and is configured to convey signals with frequencies below 2690 MHz (e.g., 1400 MHz-2690 MHz) to and from a line 321 and to convey signals with frequencies above 3400 MHz (e.g., 3400-5920 MHz) to and from a line 323. The N-plexer 318 is thus configured to pass low-mid-band signals, mid-band signals, high-band signals, and ultra-high-band signals.

Similar to the antenna front-end section 310, the antenna front-end section 330 includes, in the example of FIG. 3, two antennas, namely, antenna 332 (Ant 2) and antenna 334 (Ant 3), which are respectively connected (via antenna connector) to N-plexers 336 and 338, which may be configured to selectively apply filtering operations to extract or retain signaling from particular bands that are received from (or transmitted to) the antennas 332 and 334. The antennas 332, 334 and the antennas 312, 314 are disposed remotely from each other, e.g., at opposite ends of the wireless device from each other (i.e., the antennas 332, 334 at one end and the antennas 312, 314 at the opposite end). In this example, the N-plexer 336 coupled to the antenna 332 is configured to pass low-band, mid-band, and high-band signals. The N-plexer 336 includes a triplexer 337 (Tri-p) and a WLAN extractor 339. The triplexer 337 is a ceramic triplexer and is configured to convey signals with frequencies below 960 MHz (e.g., 700-960 MHz) to and from a line 331, to convey signals with frequencies between 1400 and 2700 MHz to and from a line 333, and to convey signals with frequencies above 3300 MHz (e.g., 3300-5920 MHz) to and from a line 335. The WLAN extractor 339 is acoustic and is configured to convey WLAN signals with frequencies used for 2G Wi-Fi to and from a line 327 and to convey mid-band and high-band WAN signals, and block WLAN signals, to and from a line 329. The triplexer 337 is connected to a ceramic diplexer 377 that includes an LPF configured to pass UHB signals (e.g., from 3300 to 5940 MHz) and an HPF configured to pass LAA/5 GHz signals. Other unlabeled LPF/HPF devices in FIG. 3 are also diplexers. Also in this example, the N-plexer 338 coupled to the antenna 334 is configured to pass Japan-band (JB), mid-band, high-band, and ultra-high-band signals. The N-plexer 338 includes a ceramic diplexer 341 (Di-p) and an acoustic GNSS extractor 343. The diplexer 341 is configured to convey mid-band to high-band signals to and from the extractor 343, and to convey signals with frequencies above 3300 MHz (e.g., 3300-5920 MHz) to and from a switch 365 connected to the diplexer 341. The extractor 343 is configured to inhibit signals with frequencies between 1400 MHz and 2690 MHz from being conveyed to or from a line 345 or the diplexer 341, and to convey signals with frequencies used for GNSS (Global Navigation Satellite System) to and from a line 347. The line 345 is, in the example shown in FIG. 3, coupled through the switch 340 to a WLAN extractor 379 that is a ceramic diplexer and includes a BSF (band-stop filter) and a BPF (band-pass filter) for directing signals as appropriate to the WLAN transceiver 372 or to an LMB+MB+HB portion of a module 374. The extractor 379 is configured to inhibit WLAN signals from and to convey WAN signals (e.g., from 1400 to 2700 MHz) to and from the line 345, and to convey WLAN signals to and from the line 347.

As further illustrated in FIG. 3, at least one antenna diversity switch 320 is coupled to the antennas 312 and 314, through the N-plexer 316, of the antenna front-end section 310. The antenna diversity switch 320 is further coupled to at least one transceiver, such as a transceiver 352 (which in the example of FIG. 3, is a WAN transceiver) through amplifier modules 354, 356). Thus, the at least one antenna diversity switch 320 establishes connectivity between the at least one transceiver 352 and at least some of the antennas of the wireless device 300 (including, in this example, the antennas 332 and 334). The connectivity between the transceiver 352 and an antenna is, here, indirect as a connection path may be established between the transceiver and an antenna via one or more other items such as a switch and/or a module (e.g., of the modules 354, 355, 356, 357, 360, 366, etc.).

Connectivity could be provided between the transceiver 352 to an antenna without using a module. In some embodiments, the antenna diversity switch 320 is a multi-port switch with multiple-inputs (allowing connectivity to multiple modules coupled to the transceiver 352) and multiple outputs (allowing connectivity to multiple antennas of the wireless device). Such a multiple-port (also referred to as multi-terminal) antenna diversity switch is configured to establish at least portions of conductive (connective) paths between the transceivers and multiple antennas located or disposed in multiple areas of the wireless device. In the example of FIG. 3, the switch 320 is a 3×3 port antenna diversity switch that implements controllable selection (e.g., via a controller 382, which may be included with a modem device 380 of the wireless device 300) of conductive paths between one or more modules connected to the transceiver 352 (e.g., the amplifier modules 354 and 356) and either of at least two of the antennas disposed in one end area of the wireless device (e.g., the antennas 312 and 314 located at the bottom end of the wireless device in the antenna front-end section 310) or either of at least two other antennas disposed in another area of the wireless device (in this example, the antennas 332 and 334 located in the top area of the wireless device in the antenna front-end section 330). Although not shown, the controller 382 is communicatively coupled to devices, e.g., switches 364, 365, that the controller 382 is configured to control (e.g., actuate), and to one or more devices for providing information to the controller 382 that the controller 382 uses to determine what device(s) to control and how to control the device(s). The controller 382 is configured to dynamically control various RF aspects of the radio paths (bands, etc.). Such RF aspects may include transmit or receive gain and antenna selection (antenna switch diversity). The modules 354, 355, 356, and 357 are each depicted as an LPAMiD (LNA-PAMiD, i.e., a low-noise amplifier (LNA), power amplifier module including duplexer (PAMiD)), that includes a low-noise amplifier (LNA), a power amplifier (PA), a duplexer, and filters. Thus, for example, in FIG. 3, the module 354 is a high-band (HB) LPAMiD+MB module (LNA+PA+integrated duplexer and filters), the module 355 is a low-band (LB) LPAMiD, the module 356 is a mid-band (MB) LPAMiD+HB module, and the module 357 is a low-mid-band (LMB)/MB LPAMiD. Transmit (Tx) and/or Receive (Rx) signals of the wireless device 300 are sent and/or received by the LPAMiD modules. In the example of FIG. 3, the wireless device 300 includes another antenna diversity switch 340 that is configured to operate in conjunction with the antenna diversity switch 320 to select and establish conductive paths from one or more transceivers. The antenna diversity switch 340 is coupled, via various amplifier modules, to another transceiver which, in this example, is a wireless LAN transceiver 372 (e.g., to process WiFi signals). Thus, connectivity between the transceiver 372 and an antenna is, here, indirect, being via at least one other entity (e.g., a switch and/or a module). The two transceivers depicted in FIG. 3 may be combined (consolidated) into a single transceiver configured to manage WAN, WLAN, and/or additional communication protocols, to thus implement a communication solution (to manage simultaneous transmission and signal reception, over different bands and technologies, and through multiple antennas used by the particular wireless device).

To illustrate, consider an example in which it is determined that signals processed by the amplifier module 354 are directed, at a first time instance, to the antenna 314 (via the antenna diversity switch 320 and the N-plexer 318). At a subsequent time instance, it may be determined that the signals processed by the amplifier 354 are to be routed to a different antenna. For example, based on measured performance of the antennas, or measured interference levels (e.g., inter-modulation interference resulting from the interaction of other wireless signals transmitted or received via the antenna 314), or based on some other factor(s) or criterion (a), a determination may be made that the signals from the amplifier 354 are to be directed to a different antenna (e.g., due to measured degradation in the performance of the antenna 314). Under such circumstances, it may be further determined that the signals may be directed to one of the various antennas located in a different area of the wireless device (e.g., the antennas 332 or 334). Accordingly, the controller 382, for example, may control or actuate the antenna diversity switch 320 to establish a conductive/connective path between the switch 320 and either of the antennas 332 or 334. That new conductive path would be established via a coaxial cable 322 (or other appropriate transmission line such as strip line, a flex cable, etc.) and, in the example of FIG. 3, the additional antenna diversity switch 340 located in the antenna end-front section 330. In some embodiments, antenna diversity switches may be used that allow directly establishing conductive paths between a module to multiple antennas (e.g., four or more antennas) without needing to route signals through multiple antenna diversity switches.

Alternatively, instead of changing the destination antenna for signals from the amplifier module 354 from the antenna 314 to one of the antennas 332 or 334 in the other end area of the wireless device, it may be determined that another antenna in the same area as the antenna 314 may be used to transmit the signals (e.g., measured antenna performance may be such that there will be less of a signal loss if the signals from the amplifier module are routed to an antenna in the same area as the current antenna). Thus, in this situation, the antenna diversity switch 320 may be controlled (e.g., by the controller 382) to establish a conductive path between the module 354 and the antenna 312. Accordingly, signals to be transmitted may be routed to different antenna(s) either on the same side where an existing path was previously in place, or to another area (farther away from the current area) of the wireless device. In embodiments in which particular signals are to be communicated from the transceiver to a different antenna in the same area of the wireless device that include the current antenna used (to transmit or receive the particular signals), the at least one antenna diversity switch is configured to dynamically establish conductive paths between the at least one transceiver and either of two antennas located in a particular area of the wireless device such that a first conductive path is established at a first time instance between the at least one transceiver and a first of the two antennas located in the particular area of the wireless device to carry signals from a particular frequency band, and a second conductive path is established at a subsequent time instance between the at least one transceiver and a second of the two antennas located in the particular area of the wireless device to carry the signals from the particular frequency band.

In some embodiments, the antenna diversity switch 320 and/or the antenna diversity switch 340 may each be three terminal (e.g., three outputs) switches, such as a 3×3 antenna switch matrix (e.g., a triple-pole, triple-throw (3P3T) switch). As noted, in some implementations, switches with more ports (and therefore more direct connectivity to modules and/or antennas) may be used, thus allowing the number of antenna diversity switches used to implement the devices and methods described herein to be reduced. For example, in some embodiments, a single antenna diversity switch may be used to establish paths to the various antennas of the wireless device. Examples of antenna diversity switches that may be used include 4×3 switches (four inputs, three outputs), 5×3 switches (five inputs, three outputs), or a switch with any other combination of inputs and outputs.

Figure 5A:
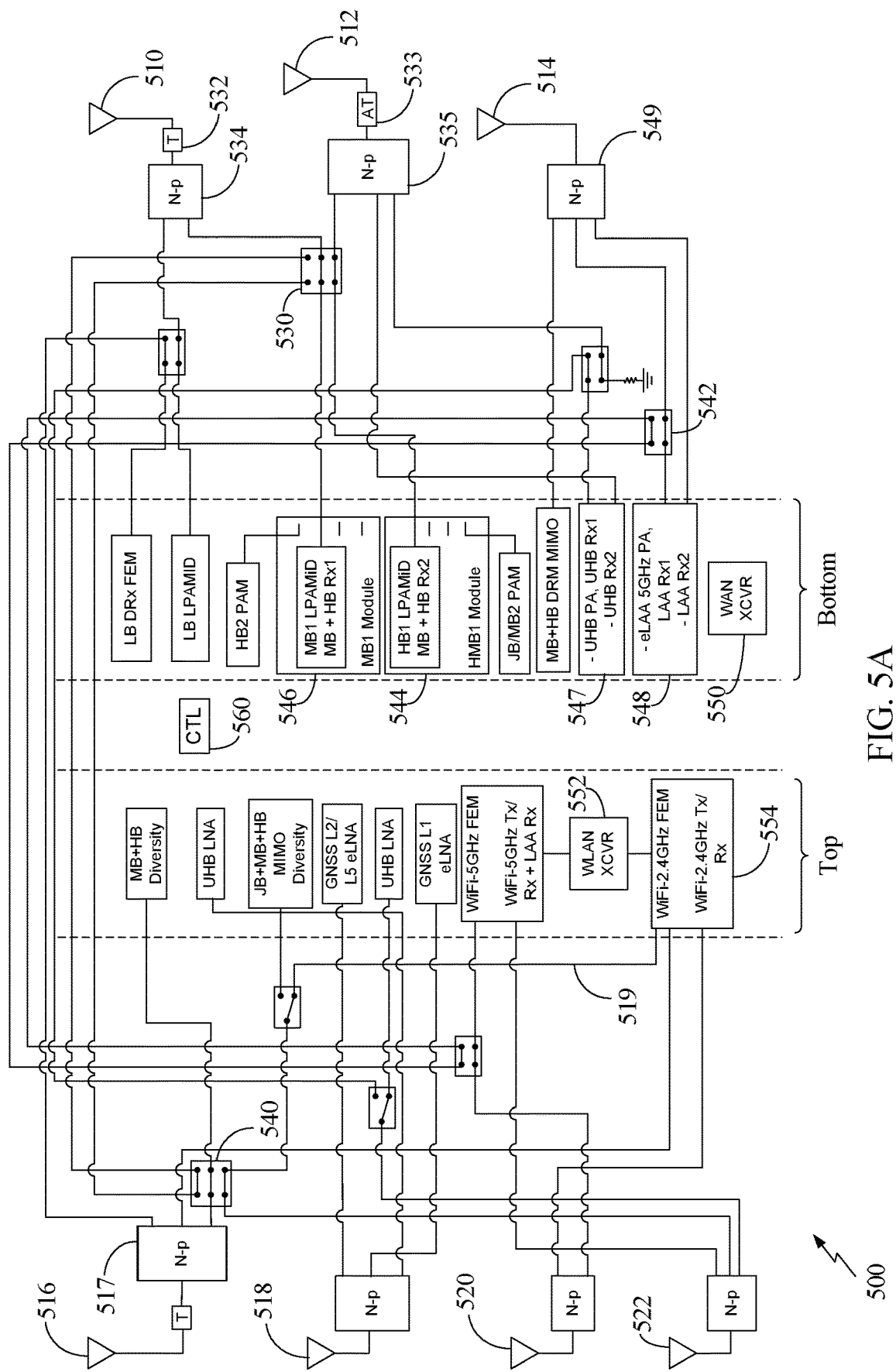
FIG. 5A is a diagram of a 7-antenna wireless device with at least one antenna diversity switch.

As noted, the front-end filtering section 350 includes the WAN transceiver 352 and various separate amplifier and filtering modules (including the amplifier modules 354 and 356 that are coupled to the antenna diversity switch 320). Similarly, the front-end filtering section 370 includes the transceiver 372 (which, in this example, is a LAN transceiver, but may be configured to control and manage other types of communication technologies and protocols), and various amplifier and/or filtering modules. In the example of FIG. 3, some of the amplifier modules, such as the module 358 (which may include an eLAA (Enhanced Licensed Assisted Access) LPAMiD module with a separate UHB receiver module) may be coupled only to a single antenna (e.g., the antenna 312 in this example) without being able to be re-routed to another antenna if conditions (environmental conditions, communication traffic conditions, including current load experienced by any particular antenna, etc.) are such that it would be efficient to re-route the module to another antenna. A single LNA may be shared for 5 GHz WLAN and LAA signals. Some modules of the front-end filtering section 350 may be connected to one of two antennas (e.g., using a 2-terminal switch). For example, the LB DRx (low band, discontinuous receive) module 360 may be connected, using a double-pole, double-throw (2P2T) switch 362, to either the antenna 312 (Ant 0) located in the bottom of the wireless device 300, or to the antenna 332 (Ant 2) at the top of the wireless device 300. Actuation of the switch 362 may also be controlled by the controller 382 (in the modem 380) or by some other controller. Additional switches to connect various modules to various antennas may include additional 2-terminal switches, delta switches (such as a delta switch 364 that is configured to couple the UHB LPAMiD module 366 to one or more of the antennas of the device 300) which may be a 4×3 switch (four inputs that can be routed to three different outputs) or a 5×3 switch (five inputs that can be routed to three different outputs), or any other multi-port switch (multiple input sources that can be routed to multiple antennas), and/or any other type of switches. An example of a delta switch, which may be similar to the switch 364, is illustrated in FIG. 5C, which shows the operation of a three-way delta switch 580. Alternatively, depending on the switching complexity implemented for the wireless device (which may depend on such consideration as cost, available space, speed, etc.), the connectivity of all, or substantially all, of the modules controlled by the transceiver 352 (and/or the transceiver 372) may be managed via a multi-port switch such as the antenna diversity switch 320 (with or without use of another such antenna diversity switch such as the switch 340).

The use of multi-port antenna diversity switches in the implementations described herein, in which signals may be routed from a current antenna to either a neighboring antenna in the same area of the wireless device as the current antenna, or to antennas in a different area of the wireless device, improves the performance and functionality of various communication processes. In a first example, the use of multi-port antenna diversity switches improves performance of carrier aggregation (CA) processes (uplink and downlink), as well as the performance of MIMO (multiple input, multiple output) processes. Carrier aggregation is the simultaneous (concurrent) reception and/or transmission of two or more signals. The term "carrier-aggregation" may refer to systems that include inter-band carrier aggregation (inter-CA) and intra-band carrier aggregation (intra-CA). Inter-CA refers to the processing of two or more separate (either contiguous or non-contiguous) carrier signals that occur in different communication bands. Intra-CA refers to the processing of two or more separate (either contiguous or non-contiguous) carrier signals that occur in the same communication band. In downlink carrier-aggregation (DLCA) situations, for example, the carrier aggregated RF signal is typically down-converted using one or more distinct local oscillator (LO) frequencies, which generally employ one or more low noise amplifiers (LNA) to process the multiple carriers present in the RF signal. The amplified signal is typically processed by down-conversion and demodulation circuitry to extract the information contained in the received signal. In Higher Order Diversity (HORxD) of a wireless device, multiple antennas are used to receive copies of the same signal (each copy corresponding to a different path) in which the wireless device processes each receiver path to increase the combined signal to noise ratio. On the transmitter side, a Tx signal may be routed, for example, to one of two antennas or to one of four antennas for transmission. On the receiver side, for an example with four receive antennas, the controller configured to cause selection of the paths, via the at least one antenna diversity switch, may be configured to establish paths between four separate antennas each receiving one of four different copies of a wireless signal, and four respective modules each configured to process one of the four different copies of the wireless signal. In a MIMO system, multiple different antennas are used in each of the transmitter and the receiver with spatial multiplexing, each antenna using the same radio channel and carrying a different data stream. For example, in some embodiments, the controller and the at least one antenna diversity switch implemented for the wireless device implement a 4×4 MIMO circuit.

The diversity switches 320, 340 and the controller 382 are configured to convey multiple transmit (Tx) signals concurrently, each to a respective antenna, and to convey multiple receive (Rx) signals concurrently, potentially from one or more of the antennas (e.g., all of the antennas) to one or more of the transceivers (e.g., all of the transceivers). The controller 382 is configured to actuate the diversity switches 320, 340 to convey (or inhibit conveyance of) signals as discussed herein. For example, the diversity switch 320 may convey Tx signals from the module 354 to the antenna 312 (via the N-plexer 316) or to the antenna 314 (via the N-plexer 318) or to the diversity switch 340, but not to the same one of these as signals are conveyed from the module 356. The diversity switch 320 may also convey Tx signals from the module 356 to the antenna 312 or the antenna 314 or to the diversity switch 340, but not to the same one of these as signals are conveyed from the module 354. The diversity switch 320 may also convey Tx signals from the diversity switch 340 to the antenna 312 or the antenna 314, but not to the same one of these as signals are conveyed from the module 354 or the module 356 (i.e., if Tx signals are being conveyed to the antenna 312 and the antenna 314, then the diversity switch 320 will not convey Tx signals from the diversity switch 340 to either of the antennas 312, 314). Similarly, the diversity switch 340 may convey Tx/Rx or Rx signals from the module 376 to the antenna 332 (via the N-plexer 336) or to the antenna 334 (via the N-plexer 338) or to the antenna diversity switch 320, but not to the same one of these as signals are conveyed from the module 374. The modules 374 and 376, in this example, are diversity modules. The diversity switch 340 may also convey Tx/Rx or Rx signals from the module 374 to the antenna 332 or the antenna 334 or to the diversity switch 320, but not to the same one of these as signals are conveyed from the module 376. The diversity switch 340 may also convey Tx signals from the diversity switch 320 to the antenna 332 or the antenna 334. If Tx signals are being conveyed to the antenna 312 and the antenna 314, however, then the diversity switch 340 will not convey Tx signals from the diversity switch 320 to either of the antennas 332, 334). Up to two WAN Tx signals, up to four WAN Rx signals, and up to two WLAN (WiFi) Tx or Rx signals (as WiFi is time domain duplexed (TDD)) may be processed by the wireless device 300 concurrently. Thus, up to two WAN Tx signals may be sent to two separate antennas concurrently, and up to two WLAN (WiFi) Tx signals sent to two separate antennas concurrently, with each of the antennas 312, 314, 332, 334 receiving a single Tx signal at any one time. Only one of the WAN Tx signals may be sent to either the antenna 332 or the antenna 334 at any one time as only one output port of the antenna diversity switch 320 is connected to the antenna diversity switch 340. Similarly, only one of the WLAN Tx signals may be sent to either the antenna 312 or the antenna 314 at any one time as only one output port of the antenna diversity switch 340 is connected to the antenna diversity switch 320. Up to four WAN Rx signals may be received concurrently and routed to appropriate modules and up to two WLAN Rx signals may be received concurrently and routed to appropriate modules, with one or more Rx signals and a Tx signal possibly passing through the same antenna concurrently.

Table 3 shows different possible scenarios of transmit signals being routed to the antennas 312, 314, 332, 334. As shown, no more than one transmit (Tx) signal is sent to a single antenna at a time. A WAN receive (Rx) signal may be received at and directed from each of the antennas 312, 314, 332, 334 at any time while a WLAN Rx signal may be received by and directed from the antenna indicated for the corresponding WLAN Tx signal either without sending of the Tx signal using that antenna or in a TDD fashion with the WLAN Tx signal sent by that antenna. In the scenarios shown in Table 3, WAN 1 may indicate a mid-band signal and WAN 2 may indicate a high-band signal, although either of these may indicate a different band or multiple bands. As shown in Table 3, the WLAN 1 signal is parked on Ant 2 and only available for transmit on Ant 2 because, as shown in FIG. 3, there is no switch between the WLAN transceiver 372 and the N-plexer 336 so the WLAN 1 signal cannot be routed to any antenna other than Ant 2. The WLAN 1 signal may not be enabled, i.e., conveyed to the antenna 332 (Ant 2) for transmission, e.g., if another Tx signal is provided to the antenna 332 for transmission. The scenarios in Table 3 support: ULCA, e.g., with WAN 1+WAN 2 with each of these being of different bands; UL MIMO, e.g., with WAN 1+WAN 2 with each of these being of the same band; or WLAN 2.4 GHz (MIMO) with UL MIMO or ULCA. The UL MIMO may be used to provide a hot spot or access point, with WAN in and WiFi out.

Suppose, in the carrier aggregation and MIMO processes example, that the wireless device is to transmit and receive a combination of signals that include signals in the B1 band and B3 band. Transmitting and receiving B1 and B3 signals through the same antenna might result in a large level of interference and noise (caused, in part, through inter-modulation noise resulting from the routing of combined multiple signals through a device or antenna). Thus, through controllable selection of a multi-port antenna diversity switch(es), multiple paths can be established between the transceiver generating/processing the signals, and the multiple antennas, in such a way that potentially interfering signals are separated and routed to different antennas. In some embodiments, the antenna paths that are established to perform carrier aggregation or MIMO processes are selected so as to increase the physical distance between the selected antennas (which could reduce the level of potential noise or interference). Increasing the physical distance between different routed signals helps to increase isolation (e.g., less noise coupling), and to lower cross-coupling factor for better MIMO performance (for UL MIMO). In the example of FIG. 3, a first path 390 is established from the transceiver 352, the module 356, the switches 320 and 340 and the antenna 332 (located at the top of the wireless device 300), on which signals in the B1 band are both transmitted and received, and on which B3 signals are received. On the other hand, to reduce potential interference and noise, a second path 392 (including the line 321) is established between the transceiver 352, the module 354, the switch 320 and the antenna 314 (located at the bottom of the wireless device 300, and thus at the opposite end from where the antenna 332 is located) to carry transmitted and received B3 signals, and to carry received B1 signals. Thus, through the actuation of the switches 320 and 340 to establish the conductive paths 390 and 392, generated wireless signals in the B1 band are transmitted through one antenna (in the example of FIG. 3, B1 signals are transmitted through the antenna 332) that is different than the antenna used to transmit signals in the B3 band (B3 signals are transmitted through the antenna 314, which is at a location on the handset that is farthest from the location of the antenna 332), thus allowing improvement of uplink carrier-aggregation (ULCA) performance for the transmission of B1 and B3 signals. At the same time, the switching configuration realized by the switches 320 and 340 allows reception of B1 and B3 signals through the antennas 314 and 332, which can result in improved performance for MIMO processes (reception of different data streams by multiple antennas), and improved performance for downlink carrier-aggregation (DLCA) processes (receiving different signals through different antennas).

TABLE 3

| | Antenna | | | |
| --- | --- | --- | --- | --- |
| Scenario | Ant 0 | Ant 1 | Ant 2 | Ant 3 |
| 1 | WAN 0 | WAN 1 | WLAN 1/WAN 2 | WLAN 0/WAN 3 |
| 2 | WAN 0 | WAN 2 | WLAN 1/WAN 1 | WLAN 0/WAN 3 |
| 3 | WAN 0 | WLAN 0/WAN 3 | WLAN 1/WAN 2 | WAN 1 |
| 4 | WAN 1 | WAN 0 | WLAN 1/WAN 2 | WLAN 0/WAN 3 |
| 5 | WAN 2 | WAN 0 | WLAN 1/WAN 1 | WLAN 0/WAN 3 |
| 6 | WLAN 0/WAN 3 | WAN 0 | WLAN 1/WAN 2 | WAN 1 |
| 7 | WAN 1 | WAN 2 | WLAN 1/WAN 0 | WLAN 0/WAN 3 |
| 8 | WAN 2 | WAN 1 | WLAN 1/WAN 0 | WLAN 0/WAN 3 |
| 9 | WAN 1 | WLAN 0/WAN 3 | WLAN 1/WAN 2 | WAN 0 |
| 10 | WLAN 0/WAN 3 | WAN 1 | WLAN 1/WAN 2 | WAN 0 |

The use of different antenna paths for different signals may allow, in some embodiments, to transmit and receive WAN-signals through one antenna, and transmit/receive wireless LAN signals (e.g., WiFI signals) through another antenna. Wireless signals in other bands (e.g., GNSS signals) may be received through yet another antenna path established on the wireless device. In some embodiments, GNSS signals may be received through a specific shareable antenna (e.g., the antenna 334 in FIG. 3) that can also transmit or receive wireless signals of other technologies (e.g., WLAN or WWAN). In such situations, GNSS signals might not be routed from other antennas to the filters and/or transceiver processing the GNSS signals. However, as noted, in some embodiments, the front end implementation for the wireless device may allow antenna diversity switching to be used for GNSS signals so that GNSS signals can be received from other antennas. Depending on factors and criteria, such as the performance metrics measured at that shareable antenna, interference levels, and so on, it may be determined to either prevent or inhibit non-GNSS signals (e.g., WAN Tx or WLAM Tx signals) from being routed to that shareable antenna (e.g., if the current signal level for received GNSS signals is too low) by actuating the antenna diversity switch connected to that antenna to disconnect any paths from the transceiver and filter modules processing non-GNSS signals to the shareable antenna. Alternatively, in some embodiments, it may be determined to establish non-GNSS paths to and from the shareable antenna so that the antenna transmits and/or receives non-GNSS signals and receives GNSS signals.

Thus, in some embodiments, the controller (of the wireless device, which controls/actuates the at least one antenna diversity switch of the wireless device to establish conductive paths) may be configured to establish independent paths between the at least one transceiver and the multiple antennas, via the at least one antenna diversity switch, such that a first wireless signal is routed through a first one of the independent paths and a second wireless signal is routed through a second one of the independent paths, with the first one of the independent paths being different from the second one of the independent paths. In such embodiments, the first wireless signal may be in the same or different frequency band as the second wireless signal. Also or alternatively, independent paths may be established between the at least one transceiver and one or more N-plexers, one or more of which may have a single connection to a corresponding antenna. Independent paths are isolated from each other, although they may use a common element (e.g., pass through the same switch), not sharing a conductive element (e.g., not concurrently using the same wire and not concurrently using the same port of a switch). The independent paths can thus be used to implement ULCA functionality (different wireless signals transmitted through different antennas), DLCA functionality (different wireless signals received through different antennas), or MIMO functionality (different streams of a signal of the same frequency and band where each stream is received by each antenna; for example, for 4×4 MIMO, four streams of different signals transmitted from four antennas are received by four antennas in the UE). The independent paths may be used to implement a hybrid combination of the ULCA, DLCA, and/or MIMO functionality (e.g., a first signal transmitted via a first antenna, a second signal transmitted through a second antenna, and a third signal, received via the second antenna at the same time that the second signal is transmitted through the second antenna, i.e., sharing antennas for transmitting and receiving signals according to different schemes). In some embodiments, the controller may be configured to establish a first path between the at least one transceiver and a first antenna to carry one or more of WLAN-based wireless signals or Bluetooth-based wireless signals, and establish a second, different, path between the at least one transceiver and a second antenna of the multiple antennas to carry WWAN-based wireless signals. In some embodiments, the controller may be further configured to establish a third path, different from the first path or the second path, between the at least one transceiver and a third antenna of the multiple antennas to carry GNSS-based wireless signals.

Figure 4A:
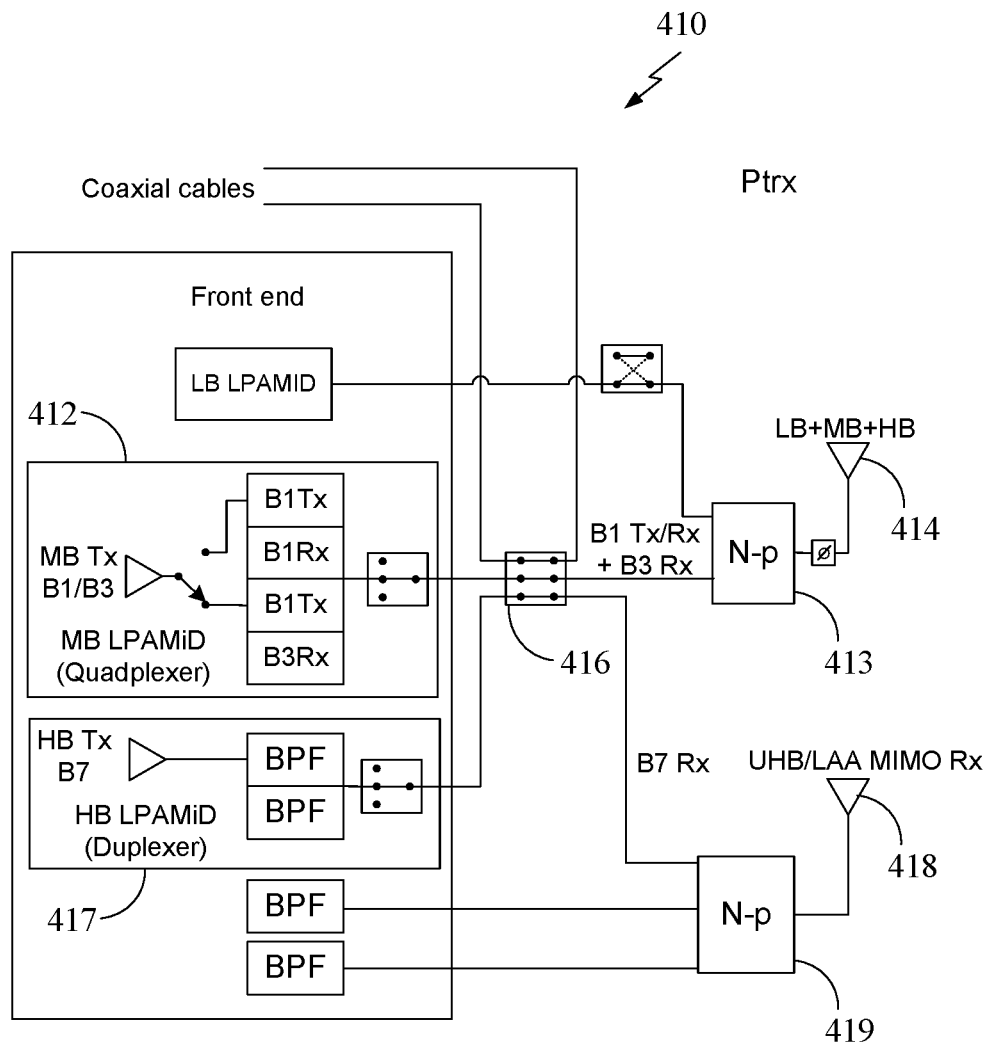
FIGS. 4A-4B are diagrams of example circuit implementations for filtering modules used in conjunction with antenna diversity switches.

As noted, the use of the antenna diversity switches facilitates routing of locally-generated transmission signals to one antenna to be transmitted to a remote device(s), while routing received signals from another antenna of the wireless device to the at least one transceiver of the wireless device. In such implementations, signal transmission and reception processes are handled by different paths (each involving a separate antenna and filter modules). Implementations in which signal transmission and reception processes are separated can also lead to simplified filtering modules and operation. Consider, for example, FIG. 4A, in which in a first circuit implementation 410, a mid-band (MB) LPAMiD module 412 is configured to perform reception and transmission functions for, in the example, B1 and B3 bands. An acoustic filter is provided for each of B1 transmit (B1Tx), B1 receive (B1Rx), B3 transmit (B3Tx), and B3 receive (B3Rx). In the first implementation, an antenna 414 (which may be similar to the antenna 312 of FIG. 3) is used for transmission and reception of wireless signals (e.g., via a switch 416 and an N-plexer 413 (N-p)). The N-plexer 413, in this example, includes an LPF and a BPF configured to pass signals with frequencies in ranges below 960 MHz (e.g., 700-960 MHz) and 1400-2690 MHz respectively. The antenna 414 may also be coupled to an HB LPAMid (duplexer) module 417 via the switch 416, and can thus controllably (selectably) connect the output from that module to one or more antennas (which may be in different areas of the wireless device). An antenna 418 is coupled to an N-plexer 419 that, in this example, includes an LPF and two BPFs that are configured to pass signals in frequency ranges below 2690 MHz (e.g., 1400-2690 MHz), 3400-3800 MHz, and 4200-5925 MHz respectively.

Figure 4B:
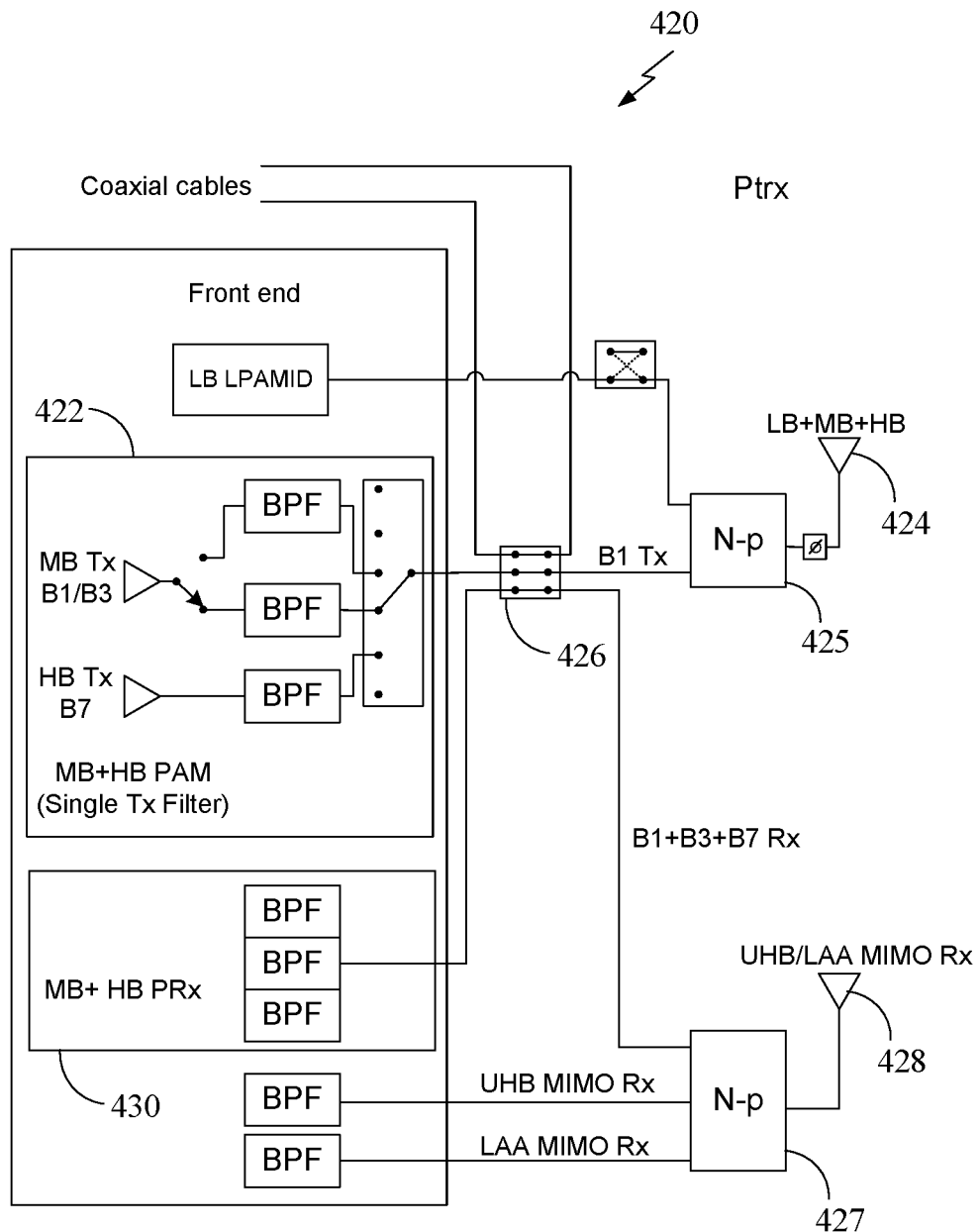

If antenna diversity switching is implemented to assign to a particular antenna, at a given time, either transmit or receive functionality, filter implementation can be simplified, with some filtering/amplification modules configured to only process signals for transmissions, while other modules are configured to only process received signals (e.g., to implement MIMO and/or DLCA functionality) in some embodiments. Accordingly, in a second circuit implementation 420, shown in FIG. 4B as an alternative to the first circuit implementation 410, filtering/processing modules are simplified (relative to the circuit implementation 410) to have Rx-only modules and Tx-only modules, each of which can be routed independently. This in turn provides better front-end (FE) insertion loss overall, lower expected power consumption and better RF sensitivity. Thus, in the second circuit implementation 420, shown in FIG. 4B as an alternative to the first circuit implementation 410, PA+filtering module 422 (MB+HB PAM) is provided that is configured to process signals for transmission. Processed signals from the module 422 are coupled to the antenna 424 (which may be similar to the antenna 414 and/or 312) via an antenna diversity switch 426 (which may be similar to the switch 320 of FIG. 3) and an N-plexer 425. The N-plexer 425, in this example, includes an LPF and a BPF configured to pass signals in frequency ranges below 960 MHz (e.g., 700-960 MHz) and 1400-2690 MHz respectively. An antenna 428 is coupled to an N-plexer 427 that, in this example, includes an LPF and two BPFs configured to pass signals in frequency ranges below 2690 MHz (e.g., 1400-2690 MHz), 3400-3800 MHz, and 4200-5925 MHz respectively. Received wireless signals are received and processed via the antenna 428 (which may be similar to the antenna 314) and routed, via the switch 426, to, for example, a signal receive filtering module 430, which has a receive signal (pairing signal) associated with the module 422. Accordingly, in such embodiments, the at least one antenna diversity switch may be actuated (controlled) to establish a first path between the at least one transceiver and a first antenna for transmission of first wireless signals, and to establish a second, different, path between the at least one transceiver and a second antenna of the multiple antennas for reception of second wireless signals. The first and second antennas may be located at opposite ends of the housing of a wireless device and disposed such that the first and second wireless signals are radiated away from each other. By separating the transmit filtering in the filtering module 422 from the receive filtering shown in the filtering module 430, a less complex filter mechanism than the quadplexer of the module 412 (FIG. 4A) may be used that introduces less loss to the transmit signals than the quadplexer of the module 412. Similar capabilities may be achieved using separate modules 574 for transmit and receive as discussed below with respect to FIG. 5B.

As noted, in some embodiments, a controller (e.g., a processor-based controller, a state-machine, an ASIC, etc., with the controller located, in some variations, in a modem module of the wireless device, in one of the antenna diversity switches, or as part of the central processor of the wireless device) is used to actuate the antenna diversity switch(es) of the wireless device to establish conductive paths between the transceiver(s) and the various antenna (via filtering/processing modules) based on one or more factors or criteria. For example, the controller may determine which conductive paths to establish (e.g., which antenna to connect to the transceiver via a particular filtering module) based on signal characteristics of the signals to be transmitted or received (e.g., the signal level, the frequency, the phase, etc.), the signal traffic load already being handled by the various antennas being considered (e.g., whether they are already transmitting or receiving other signals), performance metrics associated with the various antennas (e.g., interference/noise levels), etc. As noted, in some embodiments, wireless signals may be assigned to particular paths (and therefore to particular antennas) so that signals in different frequency bands are assigned to different antennas (i.e., so that antennas handle relatively homogenous signals in such an example). In another example, signals may be dynamically assigned to antennas (with the assignment being periodically updated) according to whether they are being transmitted or received by the wireless device. Thus, wireless signals that are being transmitted may be assigned to one subset of the antennas (and routed thereto by actuating the antenna diversity switches), while received wireless signals are assigned to another subset of antennas. Within the subsets of transmit or receive antennas, signals within certain bands may be assigned to particular antennas. Assignment of signals to antennas may be such that signals of a particular band may be assigned to antennas in one area of the wireless device, with signals of a different band(s) being assigned to antennas in another area of the wireless device in a manner that optimizes physical separation between the locations at the wireless device at which the various signals are transmitted or received.

In some implementations, the assignment of signals to antennas (and thus the establishment of paths between the wireless device's transceiver(s) and the antennas) may be based on performance metrics and/or interference levels determined for the various antennas. For example, the interference or noise level (e.g., the signal-to-noise ratios) at the various antennas of the wireless device may be periodically measured and compared to previous measured levels. If a degradation in performance of an antenna is detected (e.g., the SNR is below a pre-determined threshold level, or the difference between a previous and current signal level measurements exceeds some threshold value), signals that were transmitted or received at that antenna may now be routed to another antenna by, for example, establishing a new path from the transceiver to the other antenna (through the antenna diversity switches) to carry the signals that are carried by the current path (and current antenna), which becomes a previous path. The establishment of the new path changes (swaps) the previous path for the new path (e.g., removing the connectivity between the previous antenna and the transceiver by changing the path connection at the antenna diversity switch from the previous path to the new path). Degradation in the performance of an antenna may, for example, result from a user holding the wireless device in such a way that the affected antenna is at least partially covered by the user's hand, or signals at that antenna are at least partially blocked in some other way.

Thus, in some embodiments, a controller (such as the controller 382 of FIG. 3) is configured to establish the paths between the at least one transceiver and the multiple antennas based on determined respective performance metrics of the multiple antennas. In some embodiments, the controller is configured to establish the paths between the at least one transceiver and the multiple antennas based on respective signal interference levels (e.g., resulting from intermodulation noise, from physical blockage of the antennas, etc.) determined for the multiple antennas. In other examples, the controller may be configured to set the antenna diversity switches (to establish paths to the various disposed antennas) according to, for example, the least amount of antenna blockage (which may be determined or represented by signal strength in the handset), or based on information provided from an access point or base station (e.g., assistance data) that indicates to the receiving handset which antenna may be the best one to transmit from. Other criteria may include specific absorption rate (SAR) levels or MPE (Maximum Permissible Exposure) from 6-100 GHz, as measured by sensors internal to the device, with the measured SAR or MPE levels being compared to threshold levels (e.g., set by a regulatory body such as the FCC (Federal Communications Commission)) of acceptable radiation levels.

The use of antenna diversity switches may be used to implement wireless devices with any number of antennas, and any type of multi-antenna configuration. Thus, for example, FIG. 5A is a diagram of a 7-antenna wireless device with at least one antenna diversity switch. Implementation and operation of the 7-antenna wireless device is similar to the implementation and operation of the 4-antenna wireless device 300 of FIG. 3, except that the switching, realized using, in this example, two (2) antenna diversity switches 530 and 540, routes signals to seven different antennas disposed at different areas of the wireless device 500. As shown, the wireless device 500 includes antennas 510 (Ant 0), 512 (Ant 1), 514 (Ant 4), 516 (Ant 2), 518 (Ant 6), 520 (Ant 5), and 522 (Ant 3). These antennas may be coupled to the antenna diversity switches via N-plexers and antenna tuners (e.g., the antenna 510 is coupled to the antenna diversity switch 530 via antenna tuners 532 (e.g., an impedance tuner and an aperture tuner), and an N-plexer 534, and the antenna 512 is coupled to the antenna diversity switch 530 via an aperture tuner 533 and an N-plexer 535). The antenna 516 is coupled to an N-plexer 517 that may be configured similarly to the N-plexer 336 shown in FIG. 3. The antenna diversity switches 530 and 540 may be similar to the antenna diversity switches 320 and 340 of FIG. 3, and may be configured to controllably establish paths between some of the filtering modules of the wireless device 500 (e.g., the HB1 module 544 and the MB1 module 546, which are both electrically coupled to the WAN transceiver 550). For example, a controller 560 (which may be similar to the controller 382 of FIG. 3) may be configured to actuate the antenna diversity switches 530 and 540 (and other switches of the wireless device 500) based on such criteria and values as signal strength levels (measured at the various antennas), interference levels, traffic or load levels at the various antennas, etc. Additionally, various routing (signal assignment) strategies may be implemented to: (1) simplify the design of various filtering modules (e.g., dedicate certain modules only for signal transmission or for signal receiving at particular bands) if transmitted signals can be routed to different antennas than received signals (in a manner similar to that discussed in relation to FIGS. 4A-4B), and/or (2) to separate signals from certain bands so that they are routed to different antennas that are physically distanced from each other in order to have sufficient antenna isolation between the antennas (e.g., in order to reduce interference to handle signals in one band using an antenna at the top end area of the device, and signals in another band using an antenna at the bottom end of the device). Signals on a line 519 may be used by a WLAN FEM (front-end module) 554 to determine Bluetooth® angle of arrival.

The antennas 510, 512, 514, 516, 518, 520, 522 are each coupled to a respective N-plexer. The antenna 510 is coupled to the N-plexer 534 that, in this example, includes an LPF and a BPF configured to pass signals with frequencies in ranges below 960 MHz (e.g., 600-960 MHz) and 1700-2690 MHz respectively (for LB, MB, and HB). The antenna 512 is coupled to an N-plexer that, in this example, includes an LPF, a BPF, and an HPF configured to pass signals with frequencies in ranges below 2690 MHz (e.g., 1400-2690 MHz), 3400-3800 MHz, and above 5150 MHz (e.g., 5150-5925 MHz) respectively (for JB, MB, HB, UHB, and 5 GHz). The antenna 514 is coupled to an N-plexer 549 that, in this example, includes an LPF, a BPF, and an HPF configured to pass signals with frequencies in ranges below 2690 MHz (e.g., 1400-2690 MHz), 3400-3800 MHz, and above 5150 MHz (e.g., 5150-5925 MHz) respectively (for MB, HB, UHB, and 5 GHz). The antenna 516 is coupled to an N-plexer that, in this example, includes an LPF and a BPF configured to pass signals with frequencies in ranges below 960 MHz (e.g., 600-960 MHz) and for 2G Wi-Fi respectively, and a BSF configured to suppress signals in a range 2400-2500 MHz and allow for LB, MB, HB (1400-2690 MHz) to pass through). The antenna 518 is coupled to an N-plexer that, in this example, includes an LPF and two HPFs configured to pass signals with frequencies in ranges of GNSS L2/L5, GNSS L1, and above 3400 MHz (e.g., 3400-3800 MHz), respectively (for L2/L5 (1166-1229 MHz), L1 (1565-1610 MHz), UHB (3400-3800 MHz)). The antenna 520 is coupled to an N-plexer that, in this example, includes an LPF and an HPF configured to pass signals with frequencies in ranges below 2500 MHz (e.g., 2400-2500 MHz) and above 5150 MHz (e.g., 5150-5925 MHz) respectively (for 2.4 GHz and 5 GHz). The antenna 522 is coupled to an N-plexer that, in this example, includes an LPF, a BPF, and an HPF configured to pass signals with frequencies in ranges below 2690 MHz (e.g., 1400-2690 MHz), 3400-3800 MHz (for UHB), and above 5150 MHz (e.g., 5150-5925 MHz) respectively (for JB, MB, HB, UHB, and 5 GHz).

As noted, depending on the particular implementation of the wireless device and on desired switching complexity, some of the modules may be directly coupled to various antennas. For example, the eLAA 5 GHz PA module 548 may be coupled directly to the antenna 514 via the N-plexer 549. Furthermore, in addition to the two antenna diversity switches 530 and 540, the wireless device 500 may include additional switches, such as the switch 542, which may also be controlled by the controller 560 (or, alternatively, may be controlled by a different controller). In some embodiments, a single antenna switch may be implemented to establish conductive paths between the various filtering modules of the wireless device (which filter/process signals from transceivers such as the WAN transceiver 550, or a WLAN transceiver 552) and the various antennas of the device 500. As with the antenna diversity switches 320 and 340 of the wireless device 300, the antenna diversity switches of the wireless device 500 may be configured to controllably re-route a particular wireless signal communicated via a current antenna to another antenna that is either in the same area as the current antenna, or to an antenna located in another area of the wireless device.

To try to limit the complexity of FIG. 5A, some features are not shown. For example, a BPF of an appropriate respective range may be connected to each of the lines shown in FIG. 5A connected to the module 548 and to a module 547. Further, a BPF of an appropriate frequency range may be connected to each of the lines shown in FIG. 5A for the appropriate module for carrying UHB LNA signals (each module), GNSS L2/L5 eLNA signals, the GNSS L1 eLNA signals, Wi-Fi-SGHz FEM signals, Wi-Fi-SGHz Tx/Rx+LAA Rx signals, and Wi-Fi-2.4 GHz Tx/Rx signals.

Figure 5B:
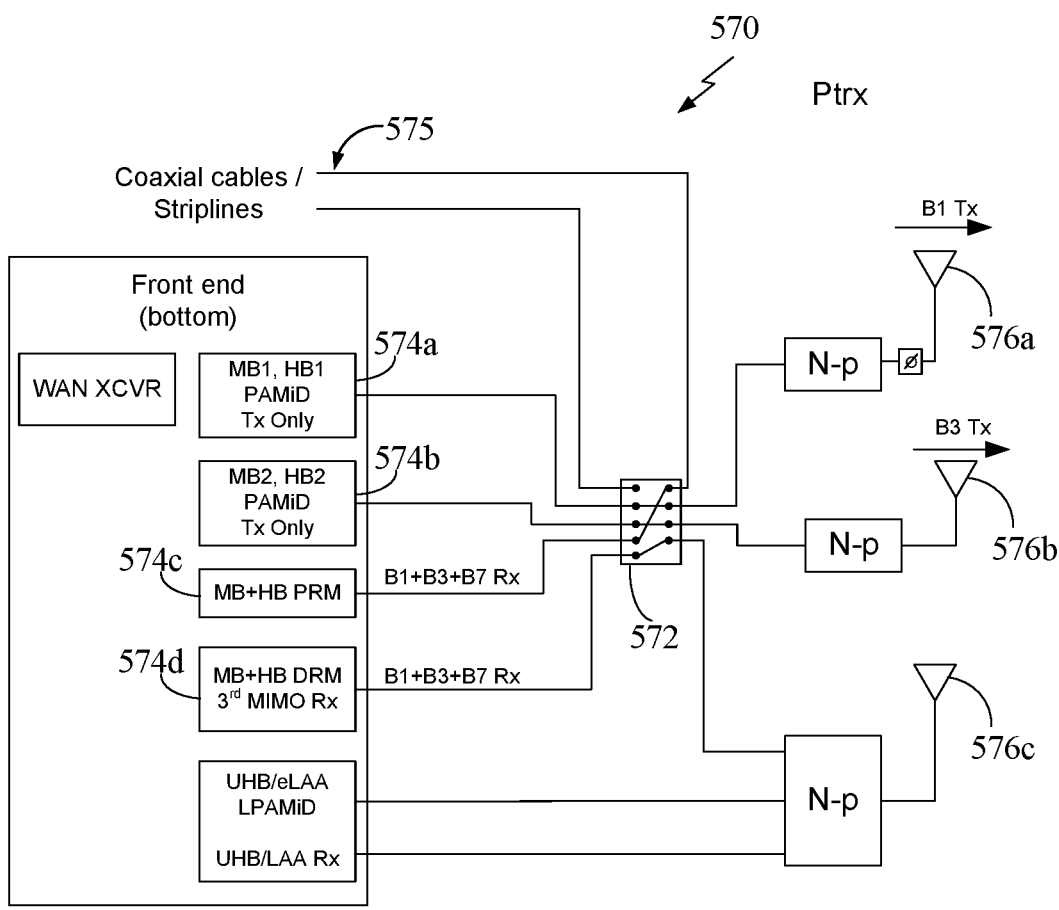
FIG. 5B is a diagram of part of a wireless device that includes a 5×4 antenna diversity switch.
Figure 5C:
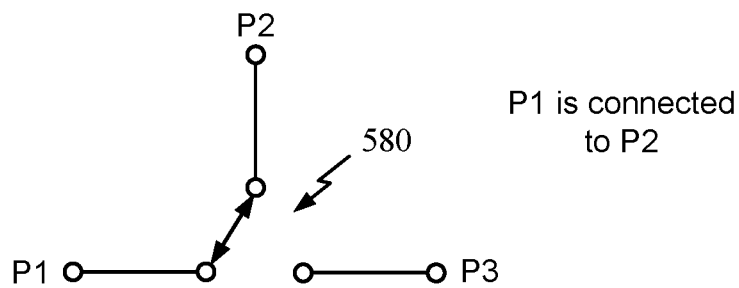
FIG. 5C is a diagram showing operation of an example delta switch.
Figure 5C:
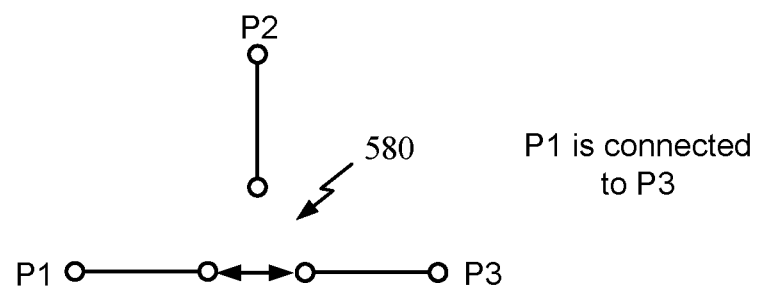
Figure 5C:
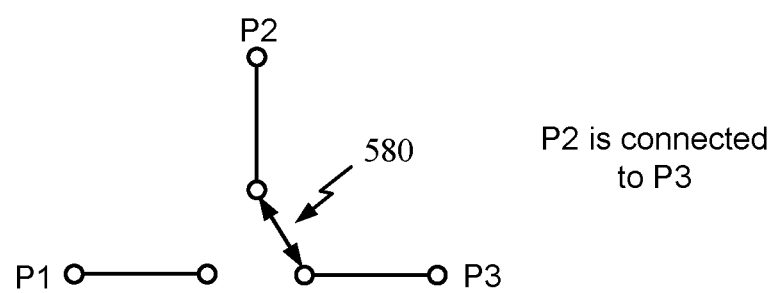

FIG. 5B is a diagram of part of a wireless device 570 that includes a 5×4 antenna diversity switch 572. The 5×4 antenna diversity switch 572 includes five input terminals and four output terminals, and thus allows at least five input sources (e.g., modules 574a, 574b, 574c, 574d and any source coupled to the switch via the coaxial cable 575) to be routed to any one of multiple antennas (e.g., antennas 576a, 576b, 576c) coupled to the switch 572.

An example of a delta switch 580, which may be similar to the switch 364 shown in FIG. 3, is illustrated in FIG. 5C. The delta switch 580 is a three-way delta switch, having three ports P1, P2, P3. The delta switch 580 may connect any two of the ports P1, P2, P3 to each other, and may transfer signals in either direction. Thus, the delta switch 580 may be actuated to couple the port P1 to the port P2, the port P2 to the port P3, or the port P3 to the port P1 to transfer signals in either direction between the connected ports. FIG. 5C shows connections between the ports P1, P2, P3 with arrows indicating direction of flow of signals, but signals may also flow in the opposite directions (i.e., the arrows may be reversed). Using the delta switch 580 as the delta switch 364 and a delta switch 365 shown in FIG. 3, signals may be conveyed from the module 366 to the antenna 334, or vice versa, at one time, and conveyed from the antenna 314 to the module 374, or vice versa, at another time using the same line between the delta switches 364, 365.

Figure 6:
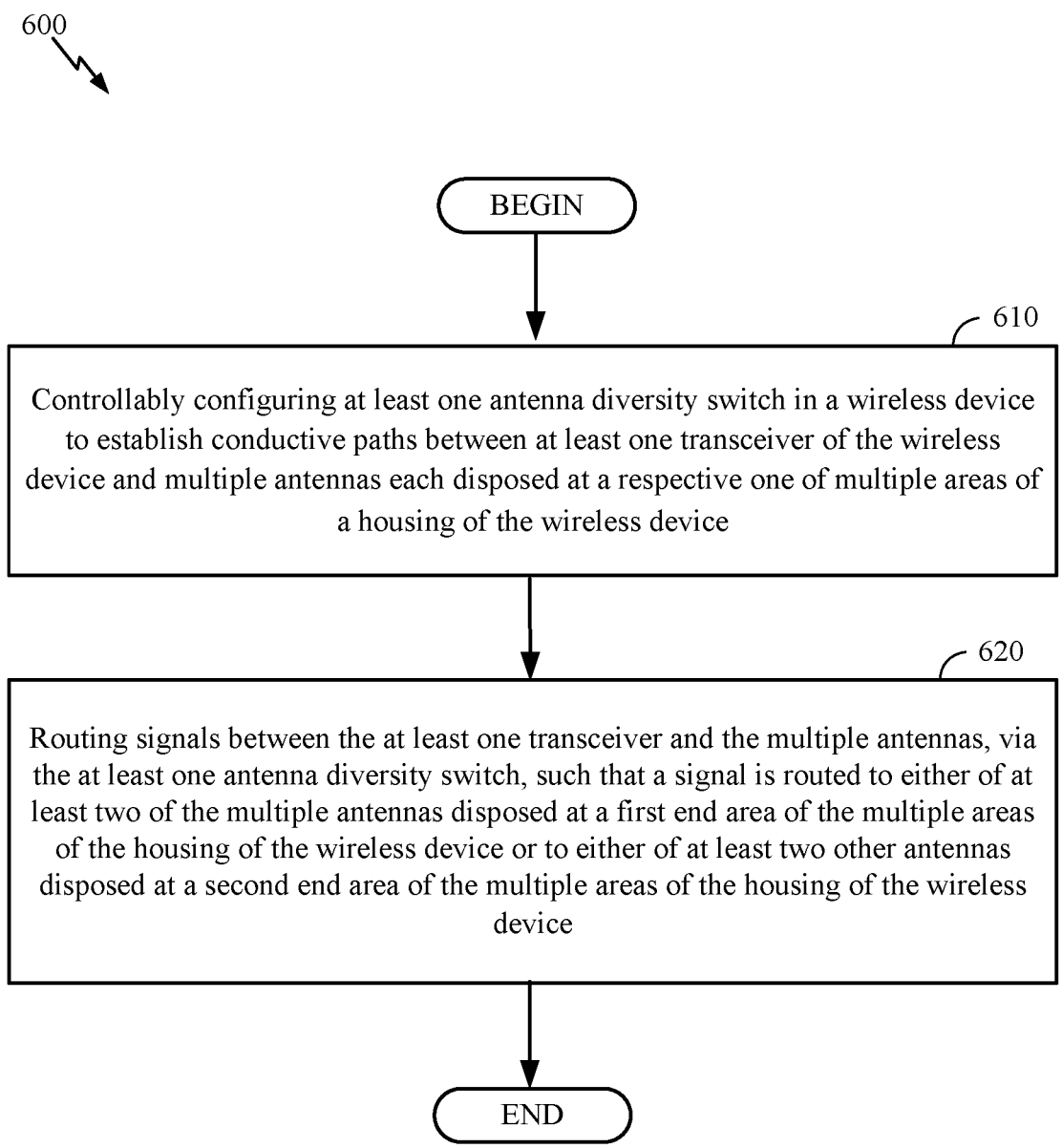
FIG. 6 is a flowchart of an example procedure for antenna diversity switching.

With reference now to FIG. 6, a flowchart of an example procedure 600 for antenna diversity switching is shown. The procedure 600 includes controllably configuring 610 at least one antenna diversity switch (e.g., a multi-port antenna switch matrix, such as a 3×3 antenna switch matrix) in a wireless device (such as the wireless devices 100, 208, 300, or 500 depicted in FIGS. 1, 2, 3, and 5) to establish conductive paths between at least one transceiver of the wireless device and multiple antennas each disposed at a respective one of multiple areas of a housing of the wireless device. In some embodiments, controllably configuring the at least one antenna diversity switch may include establishing a first path between the at least one transceiver and a first antenna to carry (for purposes of transmitting and/or receiving) signals in a first band, or relating to a first communication protocol (e.g., WLAN-based signals, such as WiFi signals), and establishing a second, different, path between the at least one transceiver and a second antenna of the multiple antennas to carry signals of a different band or relating to a different communication technology or protocol (e.g., WWAN-based signals). In such embodiments, the procedure 600 implements concurrent handling of signals from different bands using different antenna paths.

As noted, in some embodiments, different antenna can be dedicated for either signal receiving or signal transmitting, which allows simplification and/or more efficient filter processing. Thus, in such embodiments, controllably configuring the at least one antenna diversity switch may include establishing a first path between the at least one transceiver and a first antenna for transmission of first signals, and establishing a second, different, path between the at least one transceiver and a second antenna of the multiple antennas for reception of second signals. The at least one diversity switch may be controlled to establish paths to antennas to ensure that multiple transmit (Tx) signals are sent to different antennas on different, independent paths. As also noted, in some embodiments the establishment of conductive paths (antenna assignment for particular signals) may be based on various factors and criteria, such as performance of various antennas, interference levels, and so on. Thus, in such embodiments, controllably configuring the at least one antenna diversity switch may include establishing the conductive paths between the at least one transceiver and the multiple antennas based on respective signal interference levels determined for the multiple antennas.

With continued reference to FIG. 6, the procedure 600 further includes routing 620 signals between the at least one transceiver and the multiple antennas, via the at least one antenna diversity switch, such that a signal is routed to either of at least two of the multiple antennas disposed at a first end area of the multiple areas of the housing of the wireless device or to either of at least two other antennas disposed at a second end area of the multiple areas of the housing of the wireless device. In some embodiments, controllably configuring the at least one antenna diversity switch may include establishing independent paths between the at least one transceiver and the multiple antennas via the at least one antenna diversity switch, and routing the signals may include routing a first signal through a first one of the independent paths and a second signal through a second one of the independent paths, with the first one of the independent paths being different from the second one of the independent paths. In some embodiments, controllably configuring the at least one antenna diversity switch may include establishing independent paths between the at least one transceiver and one or more N-plexers each connected to a corresponding one of the multiple antennas by a single connection.

Figure 7:
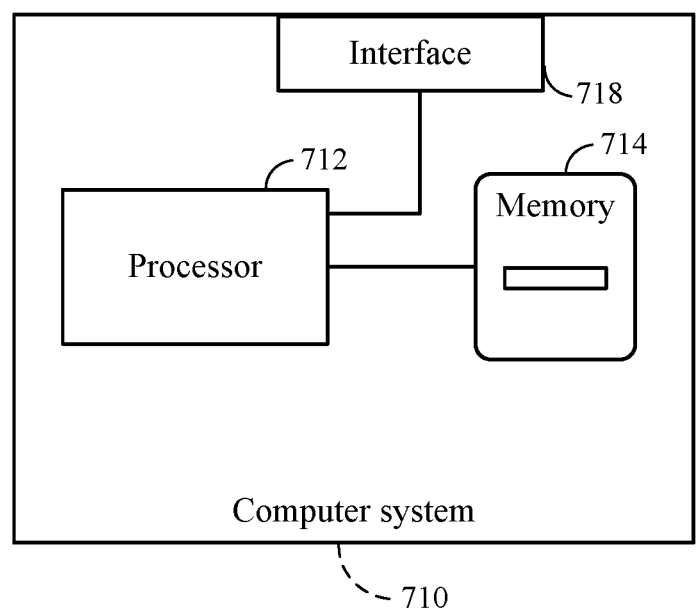
FIG. 7 is a schematic diagram of an example computer system.

Referring to FIG. 7, a computer system 710 includes a processor 712, a memory 714, and an interface 718. The computer system 710 may be an example of the controller 382 shown in FIG. 3 and/or an example of the controller 560 shown in FIG. 5A. The processor 712 is preferably an intelligent hardware device, for example a central processing unit (CPU) such as those made or designed by QUALCOMM®, ARM®, Intel® Corporation, or AMD®, a microcontroller, an application specific integrated circuit (ASIC), etc. The processor 712 may comprise multiple separate physical entities. The memory 714 may include random access memory (RAM) and/or read-only memory (ROM). The memory 714 is a non-transitory, processor-readable storage medium that stores software which is processor-readable, processor-executable software code containing instructions that are configured to, when performed, cause the processor 712 to perform various functions described herein. The software may not be directly executable by the processor 712 and instead may be configured to, for example when compiled and executed, cause the processor 712 to perform the functions. Whether needing compiling or not, the software contains the instructions to cause the processor 712 to perform the functions. The processor 712 is communicatively coupled to the memory 714. The processor 712 in combination with the memory 714 provide means for performing functions as described herein, for example, for changing signal paths through antenna diversity switches. The processor 712 is further communicatively coupled to the interface 718 and configured to send control signals via the interface to appropriate devices, e.g., the antenna diversity switches 320, 340 shown in FIG. 3 or the antenna diversity switches 530, 540 shown in FIG. 5A.

Computer programs (also known as programs, software, software applications or code) include machine instructions for a programmable processor, and may be implemented in a high-level procedural and/or object-oriented programming language, and/or in assembly/machine language. Such programs may be stored in the storage 714, that is a non-transitory, computer program product, apparatus and/or device (e.g., magnetic discs, optical disks, memory, Programmable Logic Devices (PLDs)) used to provide instructions and/or data to the processor 712.

Memory may be implemented within the computer system 710 or external to the system. As used herein the term "memory" refers to any type of long term, short term, volatile, nonvolatile, or other memory and is not to be limited to any particular type of memory or number of memories, or type of media upon which memory is stored.

Pole and throw designations noted herein may be reversed depending on chosen nomenclature.

If implemented in firmware and/or software, the functions may be stored as one or more instructions or code on a computer-readable medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

Unless defined otherwise, all technical and scientific terms used herein have the same meaning as commonly or conventionally understood. As used herein, the articles "a" and "an" refer to one or to more than one (i.e., to at least one) of the grammatical object of the article. By way of example, "an element" means one element or more than one element. "About" and/or "approximately" as used herein when referring to a measurable value such as an amount, a temporal duration, and the like, encompasses variations of ±20% or ±10%, ±5%, or +0.1% from the specified value, as appropriate in the context of the systems, devices, circuits, methods, and other implementations described herein. "Substantially" as used herein when referring to a measurable value such as an amount, a temporal duration, a physical attribute (such as frequency), and the like, also encompasses variations of ±20% or ±10%, ±5%, or +0.1% from the specified value, as appropriate in the context of the systems, devices, circuits, methods, and other implementations described herein.

As used herein, including in the claims, "or" as used in a list of items prefaced by "at least one of" or "one or more of" indicates a disjunctive list such that, for example, a list of "at least one of A, B, or C" means A or B or C or AB or AC or BC or ABC (i.e., A and B and C), or combinations with more than one feature (e.g., AA, AAB, ABBC, etc.). Also, as used herein, unless otherwise stated, a statement that a function or operation is "based on" an item or condition means that the function or operation is based on the stated item or condition and may be based on one or more items and/or conditions in addition to the stated item or condition.

A wireless communication system is one in which at least some communications are conveyed wirelessly, e.g., by electromagnetic and/or acoustic waves propagating through atmospheric space rather than through a wire or other physical connection. A wireless communication network may not have all communications transmitted wirelessly, but is configured to have at least some communications transmitted wirelessly. Further, the term "wireless communication device," or similar term, does not require that the functionality of the device is exclusively, or evenly primarily, for communication, or that the device be a mobile device, but indicates that the device includes wireless communication capability (one-way or two-way), e.g., includes at least one radio (each radio being part of a transmitter, receiver, or transceiver) for wireless communication.

While some of the techniques, processes, and/or implementations presented herein may comply with all or part of one or more standards, such techniques, processes, and/or implementations may not, in some embodiments, comply with part or all of such one or more standards.

The detailed description set forth above in connection with the appended drawings is provided to enable a person skilled in the art to make or use the disclosure. Various substitutions, alterations, and modifications may be made without departing from the spirit and scope of the disclosure. Throughout this disclosure the term "example" indicates an example or instance and does not imply or require any preference for the noted example. The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments. Thus, the disclosure is not to be limited to the examples and designs described herein but is to be accorded the widest scope consistent with the principles and novel features disclosed herein.

Although particular embodiments have been disclosed herein in detail, this has been done by way of example for purposes of illustration only, and is not limiting with respect to the scope of the appended claims, which follow. Other aspects, advantages, and modifications are considered to be within the scope of the following claims. The claims presented are representative of the embodiments and features disclosed herein. Other unclaimed embodiments and features are also contemplated. Accordingly, other embodiments are within the scope of the following claims.

What is claimed is:

1. A wireless device comprising:
   at least one transceiver configured to transmit and receive multiple signals;
   a housing comprising a first end area and a second end area, the housing containing the at least one transceiver;
   multiple antennas with at least one of the multiple antennas disposed in the first end area and at least one other of the multiple antennas disposed in the second end area;
   at least one antenna diversity switch communicatively coupled to the at least one transceiver and the multiple antennas, the at least one antenna diversity switch configured to controllably establish conductive paths between the at least one transceiver and the multiple antennas to route a signal to a selected one of: any of at least two of the multiple antennas disposed at the first end area of the housing and at least two other antennas disposed at the second end area of the housing; and
   a controller communicatively coupled to the at least one antenna diversity switch and configured to cause the at least one antenna diversity switch to establish the conductive paths between the at least one transceiver and the multiple antennas, wherein the controller is configured to dynamically cause the at least one antenna diversity switch to establish the conductive paths between the at least one transceiver and either of two antennas located in a particular area of the wireless device such that a first conductive path is established at a first time instance between the at least one transceiver and a first of the two antennas located in the particular area of the wireless device to carry signals from a particular frequency band, and a second conductive path is established at a subsequent time instance between the at least one transceiver and a second of the two antennas located in the particular area of the wireless device to carry the signals from the particular frequency band.

2. The wireless device of claim 1, further comprising an N-plexer coupled to a corresponding one of the multiple antennas, wherein the conductive paths include independent paths between the at least one transceiver and the N-plexer such that a first signal will be routed through a first one of the independent paths and a second signal will be routed through a second one of the independent paths, with the first one of the independent paths being different from the second one of the independent paths.

3. The wireless device of claim 1, wherein the conductive paths include independent paths between the at least one transceiver and the multiple antennas, the independent paths including a transmit path and a receive path, the transmit path being configured to convey a transmit signal without concurrently conveying a receive signal.

4. The wireless device of claim 3, wherein a first one of the independent paths connects a first signal processing module of the wireless device to a first antenna of the multiple antennas and a second one of the independent paths connects a second signal processing module of the wireless device to a second antenna of the multiple antennas, the first signal processing module being different than the second signal processing module and the first antenna being separate from the second antenna.

5. A wireless device comprising:
at least one transceiver configured to transmit and receive multiple signals;
a housing comprising a first end area and a second end area, the housing containing the at least one transceiver;
multiple antennas with at least one of the multiple antennas disposed in the first end area and at least one other of the multiple antennas disposed in the second end area;
at least one antenna diversity switch communicatively coupled to the at least one transceiver and the multiple antennas, the at least one antenna diversity switch configured to controllably establish conductive paths between the at least one transceiver and the multiple antennas to route a signal to a selected one of: any of at least two of the multiple antennas disposed at the first end area of the housing and at least two other antennas disposed at the second end area of the housing; and
a controller communicatively coupled to the at least one antenna diversity switch and configured to cause the at least one antenna diversity switch to establish the conductive paths between the at least one transceiver and the multiple antennas, wherein the controller is configured to cause the at least one antenna diversity switch to establish a first path of the conductive paths between the at least one transceiver and a first antenna of the multiple antennas for transmission of first signals, and to establish a second path of the conductive paths between the at least one transceiver and a second antenna of the multiple antennas for transmission of second signals, the first antenna and the second antenna configured and disposed to radiate the first signals and the second signals away from each other, the first path being separate from the second path.

6. The wireless device of claim 5, wherein the controller is configured to cause the at least one antenna diversity switch to establish the first path to carry one or more of WAN-based signals or Bluetooth-based signals, and establish the second path to carry WLAN-based signals.

7. The wireless device of claim 6, wherein the controller is configured to cause the at least one antenna diversity switch to establish a third path of the conductive paths between the at least one transceiver and a third antenna of the multiple antennas to carry GNSS-based signals, the third path being separate from the first path and the second path.

8. The wireless device of claim 1, wherein the at least one antenna diversity switch comprises at least three throws and at least three poles.

9. A wireless device comprising:
at least one transceiver configured to transmit and receive multiple signals;
a housing comprising a first end area and a second end area, the housing containing the at least one transceiver;
multiple antennas with at least one of the multiple antennas disposed in the first end area and at least one other of the multiple antennas disposed in the second end area;
at least one antenna diversity switch communicatively coupled to the at least one transceiver and the multiple antennas, the at least one antenna diversity switch configured to controllably establish conductive paths between the at least one transceiver and the multiple antennas to route a signal to a selected one of: any of at least two of the multiple antennas disposed at the first end area of the housing and at least two other antennas disposed at the second end area of the housing; and
a controller communicatively coupled to the at least one antenna diversity switch and configured to cause the at least one antenna diversity switch to establish the conductive paths between the at least one transceiver and the multiple antennas, wherein the controller is configured to cause the at least one antenna diversity switch to establish multiple paths of the conductive paths between four separate antennas each receiving a different copy of a signal, and respective four modules each configured to process one of the four different copies of the signal.

10. The wireless device of claim 9, wherein the at least one antenna diversity switch comprises: a 3x3 antenna matrix switch, a 4x3 antenna matrix switch, a 5x3 antenna matrix switch, or a 5x4 antenna matrix switch, or any combination thereof.

11. The wireless device of claim 1, wherein the controller is further configured to cause the at least one antenna diversity switch to establish the conductive paths between the at least one transceiver and the multiple antennas based on a respective performance metric of each of the multiple antennas.

12. The wireless device of claim 1, wherein the controller is further configured to cause the at least one antenna diversity switch to establish the conductive paths between the at least one transceiver and the multiple antennas based on a respective signal interference level of each of the multiple antennas.

13. An apparatus comprising:
control means for controllably configuring at least one antenna diversity switch in a wireless device to establish conductive paths between at least one transceiver of the wireless device and multiple antennas disposed at respective multiple areas of a housing of the wireless device; and
routing means for routing signals between the at least one transceiver and the multiple antennas, via the at least one antenna diversity switch, such that a signal is routed to either of at least two of the multiple antennas disposed at a first end area of the housing of the wireless device or to either of at least two other antennas disposed at a second end area of the housing of the wireless device, wherein the control means are for establishing a first path between the at least one transceiver and a first antenna of the multiple antennas to carry one or more of WLAN-based signals or Bluetooth-based signals, for establishing a second path between the at least one transceiver and a second antenna of the multiple antennas to carry WWAN-based signals, and for establishing a third path, different from the first path or the second path, between the at least one transceiver and a third antenna of the multiple antennas to carry GNSS-based wireless signals.

14. The apparatus of claim 13, wherein the control means are further for establishing independent paths between the at least one transceiver and one or more N-plexers, each coupled to a respective antenna of the multiple antennas, via the at least one antenna diversity switch, such that a first signal is routed through a first one of the independent paths and a second signal is routed through a second one of the independent paths, with the first one of the independent paths being different from the second one of the independent paths.

15. The apparatus of claim 14, wherein the routing means are for:
routing a transmit signal from the at least one transceiver to the at least one antenna diversity switch on a first path without concurrently conveying a first receive signal on the first path;
routing the transmit signal from the at least one antenna diversity switch to a first antenna of the multiple antennas; and
routing one or more second receive signals, received via a second antenna of the multiple antennas, from the at least one antenna diversity switch to the at least one transceiver on a second path, the second antenna being separate from the first antenna.

16. The apparatus of claim 14, wherein the first signal is a first transmit signal and has a first frequency and the second signal is a second transmit signal and has a second frequency that is different from the first frequency, and wherein the routing means are for routing a first received signal having the first frequency and a second received signal having the second frequency from a same one of the multiple antennas to the at least one transceiver via the first one of the independent paths.

17. The apparatus of claim 13, wherein the control means are further for establishing the conductive paths between the at least one transceiver and the multiple antennas based on a respective performance metric of each of the multiple antennas.

18. A wireless device comprising:
a first antenna disposed in a first area of the wireless device;
a second antenna disposed in the first area of the wireless device;
a third antenna disposed in a second area of the wireless device, the second area being separated from the first area;
one or more transceivers;
a first switch comprising at least three poles and at least three throws, a first pole of the first switch coupled to a first signal path associated with at least one transceiver of the one or more transceivers, a second pole of the first switch coupled to a second signal path associated with the at least one transceiver of the one or more transceivers or a second transceiver of the one or more transceivers, a first throw of the first switch coupled to the first antenna, and a second throw of the first switch coupled to the second antenna; and
a second switch having a pole coupled to a third throw of the first switch and a throw coupled to a third pole of the first switch, the second switch further having at least one throw coupled to the third antenna.

19. The wireless device of claim 18, wherein the second switch comprises at least three poles and at least three throws, a first pole of the second switch coupled to a third signal path associated with at least one additional transceiver, a second pole of the second switch coupled to a fourth signal path associated with the at least one additional transceiver or a further additional transceiver, a third pole of the second switch coupled to the third throw of the first switch, a first throw of the second switch coupled to the third antenna, a second throw of the second switch coupled to a fourth antenna, and a third throw of the second switch coupled to the third pole of the first switch.

20. The wireless device of claim 19, wherein the at least one transceiver comprises a WAN transceiver, and the at least one additional transceiver comprises a WLAN transceiver.

21. The wireless device of claim 18, wherein the first antenna and the second antenna are coupled to the first throw of the first switch and the second throw of the first switch via a first N-plexer and a second N-plexer, respectively.

22. The wireless device of claim 21, wherein the first N-plexer is coupled to a third switch, the third switch being further coupled to a third signal path associated with the at least one transceiver of the one or more transceivers, and wherein the second N-plexer is further coupled to a fourth switch, the fourth switch being coupled to a fourth signal path associated with the at least one transceiver of the one or more transceivers or the second transceiver of the one or more transceivers.

* * * * *